US012438277B2

(12) United States Patent
Zhao et al.

(10) Patent No.: US 12,438,277 B2
(45) Date of Patent: Oct. 7, 2025

(54) CIRCULARLY POLARIZED ANTENNAS AND WEARABLE DEVICES

(71) Applicant: Anhui Huami Health Technology Co., Ltd., Anhui FTZ (CN)

(72) Inventors: Anping Zhao, Anhui FTZ (CN); Yajun Zhao, Anhui FTZ (CN)

(73) Assignee: Anhui Huami Health Technology Co., Ltd., Anhui FTZ (CN)

( * ) Notice: Subject to any disclaimer, the term of this patent is extended or adjusted under 35 U.S.C. 154(b) by 126 days.

(21) Appl. No.: 18/185,023

(22) Filed: Mar. 16, 2023

(65) Prior Publication Data

US 2023/0231311 A1 Jul. 20, 2023

Related U.S. Application Data

(63) Continuation of application No. PCT/CN2021/118410, filed on Sep. 15, 2021.

(30) Foreign Application Priority Data

Sep. 29, 2020 (CN) ......................... 202011051024.1
Sep. 29, 2020 (CN) ......................... 202022193631.3

(51) Int. Cl.
*H01Q 9/04* (2006.01)
*H01Q 1/27* (2006.01)
*H01Q 5/328* (2015.01)

(52) U.S. Cl.
CPC ........... *H01Q 9/0464* (2013.01); *H01Q 1/273* (2013.01); *H01Q 5/328* (2015.01)

(58) Field of Classification Search
CPC ....... H01Q 1/273; H01Q 9/0464; H01Q 5/328
See application file for complete search history.

(56) References Cited

U.S. PATENT DOCUMENTS

2014/0266920 A1* 9/2014 Tran ....................... H01Q 1/243 343/702
2019/0109367 A1 4/2019 Tseng et al.
(Continued)

FOREIGN PATENT DOCUMENTS

CN 105785757 A 7/2016
CN 108695587 A 10/2018
(Continued)

OTHER PUBLICATIONS

Qu Longyue et al: "Integrated GPS Antenna with Circular Polarization for Metal-Rimmed Smartwatch Applications", 2018 IEEE International Symposium On Antennas and Propagation & USNC/URSI National Radio Science Meeting, IEEE, Jul. 8, 2018 (Jul. 8, 2018), pp. 949-950.

(Continued)

*Primary Examiner* — Daniel Munoz
(74) *Attorney, Agent, or Firm* — Young Basile Hanlon & MacFarlane, P.C.

(57) ABSTRACT

Provided are a circularly polarized antenna and a wearable device. The circularly polarized antenna is applicable to a wearable device, the antenna including: an annular gap structure including an annular antenna radiator, the radiator having an effective perimeter equal to a wavelength corresponding to a central operating frequency of the circularly polarized antenna; a feeding terminal connected across the gap structure, electrically connected to the radiator at one end, and connected to a feeding module of a mainboard of the wearable device at the other end; and at least one first grounding terminal connected across the gap structure, electrically connected to the radiator at one end, and electrically connected to a grounding module of the mainboard via an inductor at the other end.

20 Claims, 17 Drawing Sheets

(56) References Cited

U.S. PATENT DOCUMENTS

| | | | | |
|---|---|---|---|---|
| 2019/0210703 | A1* | 7/2019 | Sepanniitty | H01Q 9/0421 |
| 2020/0365974 | A1* | 11/2020 | Wei | H01Q 9/42 |

FOREIGN PATENT DOCUMENTS

| | | | | |
|---|---|---|---|---|
| CN | 112003006 | A | 11/2020 | |
| CN | 212626049 | U | 2/2021 | |
| EP | 2296227 | A2 * | 3/2011 | H01Q 21/24 |
| EP | 3382795 | A1 | 10/2018 | |
| WO | 2016078496 | A1 | 5/2016 | |
| WO | 2016119172 | A1 | 8/2016 | |
| WO | 2017088164 | A1 | 6/2017 | |

OTHER PUBLICATIONS

Extended European Search Report for European Application No. 21874244.3 dated Nov. 13, 2023.

International Search Report and English translation for International Application No. PCT/CN2021/118410 dated Oct. 20, 2021.

* cited by examiner

CIRCULARLY POLARIZED ANTENNAS AND WEARABLE DEVICES

CROSS-REFERENCE TO RELATED APPLICATION(S)

The present application is a continuation of PCT/CN2021/118410, filed Sep. 15, 2021, which claims priority and benefit of Chinese Patent Application Nos. 202022193631.3 and 202011051024,1, both filed Sep. 29, 2020, the entire disclosures of all of which are hereby incorporated by reference.

TECHNICAL FIELD

The present disclosure relates to the technical field of wearable devices, and in particular to a circularly polarized antenna and a wearable device.

BACKGROUND

Wearable devices are becoming more and more popular among users due to diverse functions thereof. These functions may be implemented by means of built-in antennas of the wearable devices.

Taking a satellite positioning antenna as an example, with the development of the wearable devices, satellite positioning has become one of the most important functions. For the purpose of satellite positioning and trajectory recording, the satellite positioning antenna is essential. In order to enhance a transmission efficiency from the satellite to the ground, e.g., to enhance a penetration capacity, a coverage area and/or the like, a transmitting antenna of the satellite to the ground is circularly polarized. Likewise, in order to enhance a reception capability of a positioning antenna, a receiving antenna of a device may adopt a circularly polarized antenna similar to the transmitting antenna.

However, sometimes it can be difficult to adopt circularly polarized antennas in the wearable devices due to the limitation of volume or industrial design, and linearly polarized antennas are generally adopted, which lead to poor satellite positioning performance. For example, inefficient reception of satellite signals by antennas when a user is in a complex environment such as the shade of a tree, and errors in determining a user's location due to reflection in the case of a multipath environment, may lead to inaccurate capture of positioning and motion trajectories.

SUMMARY

In order to improve the accuracy of the satellite positioning, implementations of the present disclosure provide a circularly polarized antenna and a wearable device.

In a first aspect, an implementation of the present disclosure provides a circularly polarized antenna, applicable to a wearable device, the antenna including:

- an annular gap structure including an annular antenna radiator, the radiator having an effective perimeter equal to a wavelength corresponding to a central operating frequency of the circularly polarized antenna;
- a feeding terminal connected across the gap structure, electrically connected to the radiator at one end, and connected to a feeding module of a mainboard of the wearable device at the other end; and
- at least one first grounding terminal connected across the gap structure, electrically connected to the radiator at one end, and electrically connected to a grounding module of the mainboard via an inductor at the other end.

In an implementation, a line connected between the feeding terminal and a center point of the radiator is a first connecting line, and a line connected between the first grounding terminal and the center point of the radiator is a second connecting line, and a first included angle α is formed from the first connecting line to the second connecting line along a first direction;

- the first direction is a clockwise direction around the radiator; and $$\alpha \in \left(0, \frac{\pi}{2}\right) \cup \left(\pi, \frac{3\pi}{2}\right),$$

$$\text{or } \alpha \in \left(\frac{\pi}{2}, \pi\right) \cup \left(\frac{3\pi}{2}, 2\pi\right).$$

In an implementation, the circularly polarized antenna further includes:

- at least one second grounding terminal electrically connected to the radiator at one end, and electrically connected to the grounding module of the mainboard via a capacitor at the other end.

In an implementation, a line connected between the feeding terminal and a center point of the radiator is a first connecting line, and a line connected between the second grounding terminal and the center point of the radiator is a third connecting line, and a second included angle β is formed from the first connecting line to the third connecting line along a second direction;

- the second direction is a counterclockwise direction around the radiator; and $$\beta \in \left(0, \frac{\pi}{2}\right) \cup \left(\pi, \frac{3\pi}{2}\right),$$

$$\text{or } \beta \in \left(\frac{\pi}{2}, \pi\right) \cup \left(\frac{3\pi}{2}, 2\pi\right).$$

In an implementation, the capacitor includes a transient voltage suppressor (TVS).

In an implementation, the gap structure includes a gap formed between the radiator and the mainboard.

In an implementation, the radiator includes a metal bezel of the wearable device, or the radiator includes a metal middle frame of the wearable device.

In an implementation, the radiator includes a metal bezel of the wearable device, and the gap structure includes a gap formed between the metal bezel and a metal middle frame of the wearable device.

In an implementation, the radiator has an annular structure in one of shapes including:

- a circular ring, an elliptical ring, a rectangular ring, a triangular ring, a diamond ring, or a polygonal ring.

In an implementation, the circularly polarized antenna includes one of:

- a satellite positioning antenna, a Bluetooth antenna, a WiFi antenna, or a 4G/5G antenna.

In a second aspect, an embodiment of the present disclosure provides a wearable device, including the circularly polarized antenna according to any one of the embodiments in the first aspect.

In an implementation, the wearable device further includes:

a housing in which the mainboard is disposed, the housing including a non-metallic middle frame and a bottom case; and an annular metal bezel fixedly disposed on an end surface of the middle frame away from the bottom case, where the metal bezel is disposed above the mainboard to form the radiator.

In an implementation, the wearable device further includes:

a second antenna disposed on the mainboard, the second antenna having a radiation branch coupled with the metal bezel.

In an implementation, the circularly polarized antenna includes a GPS antenna for satellite positioning, and the second antenna includes a Bluetooth antenna, or a WiFi antenna.

In an implementation, the wearable device further includes:

a housing in which the mainboard is disposed, the housing including a metal middle frame and a non-metallic bottom case, and the middle frame forming the radiator.

In an implementation, the wearable device further includes:

a housing in which the mainboard is disposed, the housing including a metal middle frame and a bottom case, and the middle frame being electrically connected to the grounding module of the mainboard; and an annular metal bezel fixedly disposed on an end surface of the middle frame away from the bottom case, where an insulating layer is provided between the middle frame and the metal bezel, such that the gap structure is formed between the middle frame and the metal bezel, and the metal bezel forms the radiator.

In an implementation, the wearable device includes a smart watch, a smart bracelet, smart earphones, or smart glasses.

BRIEF DESCRIPTION OF DRAWINGS

In order to explain technical solutions in DETAILED DESCRIPTION OF IMPLEMENTATIONS of the present disclosure or in the related art more clearly, the drawings to be used in the DETAILED DESCRIPTION or description of the related art will be briefly introduced below. It is apparent that the drawings in the following description illustrate some implementations of the present disclosure. For those ordinary skilled in the art, other drawings may be obtained from these drawings without any creative efforts.

DETAILED DESCRIPTION

Figure 1:
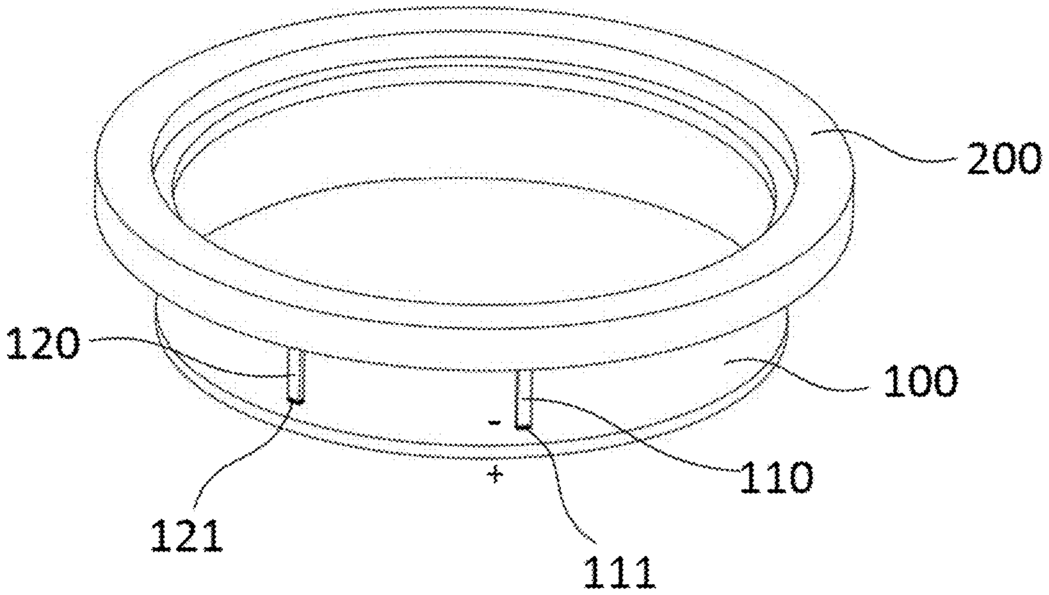
FIG. 1 is a schematic diagram of a circularly polarized antenna structure according to some implementations of the present disclosure.

Implementations of the present disclosure will be clearly and completely described below in conjunction with the accompanying drawings. It is apparent that the described implementations are part of the implementations of the present disclosure, rather than all of the implementations. All other implementations obtained by those ordinary skilled in the art based on the implementations of the present disclosure without any creative efforts shall fall within the protection scope of the present disclosure. In addition, technical features involved in different implementations of the present disclosure described below may be combined with each other as long as they do not conflict with each other.

Circularly polarized antennas are commonly applied in satellite navigation systems. This is due to the fact that circularly polarized waves produced by the circularly polarized antennas may be received by linearly polarized antennas in any direction, and the circularly polarized antennas may receive incoming waves from the linearly polarized antennas in any direction, resulting in a good antenna performance. Therefore, the circularly polarized antennas are commonly used in satellite positioning, reconnaissance and jamming. Compared with the linearly polarized antennas, the main advantages of the circularly polarized antennas lie in that a satellite signal received by a ground device has a strength that increases by about 3 dB in the case of a comparable antenna efficiency, while the capacity of a satellite positioning system of the receiving device in resisting multipath and interference may be enhanced in a complex environment, which in turn may lead to more accurate positioning and motion trajectories.

The circularly polarized antennas may be divided into left-hand circularly polarized (LHCP) antennas and right-hand circularly polarized (RHCP) antennas. Taking satellite positioning antennas as an example, the major global satellite navigation and positioning systems include GPS, BeiDou, GLONASS, and Galileo, and the satellite positioning antennas for civil use in these positioning systems all adopt the right-hand circularly polarized antennas.

With the development of wearable devices, a satellite positioning function has become an essential function. Taking smart watches as an example, the satellite positioning function may be used in various application scenarios such as motion assistance, trajectory detection, and positioning. The satellite positioning antennas in relevant wearable devices on the market are mostly implemented by the linearly polarized antennas, such as IFAs (Inverted-F Antennas), and slot antennas. However, as can be seen from the above, the linearly polarized antennas have lower efficiency in receiving the circularly polarized waves transmitted from the satellite, which leads to poor positioning accuracy and trajectory detection performance of the wearable devices, making them difficult to meet requirements for high-accuracy positioning.

In order to solve the above problems, some smart watches in the related art use the circularly polarized antennas as the satellite positioning antennas.

For example, in an implementation scheme in the related art, the circularly polarized antenna performance is generated by feeding an inverted-F antenna (IFA) under a metal ring on an upper surface of the watch, and coupling another antenna parasitic unit (i.e., a grounding branch at the side of the IFA) with the metal ring of the watch. In this circularly polarized design, in order to produce a circulating current in the metal ring, a length of the IFA antenna, a length of the parasitic unit, a gap between the IFA antenna and the metal ring, and a gap between the parasitic unit and the metal ring may meet certain requirements so as to "pull" the current in the metal ring to produce an effective circulating current. The term "effective circulating current" referred to herein means that the produced circulating current may be circulated uniformly along the metal ring as the phase changes, so as to enable the axial ratio of the circularly polarized antenna to be no more than 3 dB.

For another example, in another implementation scheme in the related art, the parasitic unit in the above scheme is omitted, that is, only the fed IFA antenna and the metal ring of the watch are coupled to realize circular polarization. Although part of the structure is simplified in this scheme, its realization is similar to the above scheme, where the circulating current in the metal ring is realized by the coupling between the IFA antenna (and the parasitic unit) and the metal ring.

There are often special requirements for the lengths of the IFA antenna, the parasitic unit, and the metal ring of the watch as well as the gaps between them in the above two implementation schemes in the related art, which undoubtedly increases the difficulty of antenna design. Moreover, in the above two implementation schemes, the IFA antenna (and the parasitic unit) is an FPC (Flexible Printed Circuit) antenna or LDS (Laser Direct Structuring) antenna placed on an antenna bracket, and the antenna bracket occupies the limited space in the watch, so these schemes are difficult to apply to the wearable devices with limited volumes. In addition, the circularly polarized antennas in the above two implementation schemes are only applicable to the case where an original or inherent resonant frequency of an antenna radiator itself is greater than an operating frequency of GPS that is 1.575 GHz, and thus are less applicable, as explained in the following description, which will not be detailed herein.

In view of the above, embodiments of the present disclosure provide a circularly polarized antenna with a simple and effective structure, and the antenna is applicable to a wearable device, enabling the device to implement an antenna in a circularly polarized form. In particular, the circularly polarized antenna according to the present disclosure is applicable to the case where an original or inherent resonant frequency of an antenna radiator itself is less than or greater than an operating frequency of GPS that is 1.575 GHz.

It can be understood that the wearable device described in the following implementations of the present disclosure can be any form of device suitable for implementation, such as, for example, a watch-type device such as a smart watch or a smart bracelet; a glass-type device such as smart glasses, VR glasses, or AR glasses; and a wearable device such as smart clothing, smart earphones, or wearing accessories, which is not limited in the present disclosure.

In some implementations, the antenna structure in the present disclosure includes an annular gap structure. For example, in the implementation shown in FIG. 1, the gap structure includes an annular antenna radiator 200, where the radiator 200 can be a metal radiator, such as, for example, a metal ring. The radiator 200 is disposed above a mainboard 100 in parallel with the mainboard 100, and there is a gap between the radiator 200 and the mainboard 100 which forms the gap structure of the antenna, and the function of the antenna is implemented by feeding and grounding the gap. In this implementation, the periphery of the mainboard 100 has a similar shape to that of the annular radiator 200, such that a relatively uniform and complete annular gap is formed between the mainboard 100 and the radiator 200.

In some implementations, the mainboard 100 is a main PCB (Printed Circuit Board) of the device with processors and corresponding control circuit modules (not shown in the drawings) integrated thereon. The radiator 200 is an annular metal radiator such as a metal ring, and the radiator 200 is disposed above the mainboard 100, such that a gap is formed between the radiator 200 and the mainboard 100. The radiator 200 is electrically connected to the mainboard 100 via a feeding terminal 110 and at least one first grounding terminal 120, the feeding terminal 110 is connected to a feeding module of the mainboard 100 at a feeding point 111, and the grounding terminal 120 is connected to a grounding module of the mainboard 100 via an inductor 121, thereby forming the antenna structure.

The feeding terminal 110 is connected across the gap formed between the mainboard 100 and the radiator 200, that is, one end of the feeding terminal 110 is electrically connected to the radiator 200, and the other end of the feeding terminal 110 is connected to the feeding module of the mainboard 100. It can be understood that, the feeding terminal 110 and the radiator 200 can be separately formed or integrally formed, which is not limited in the present disclosure. In an example, the feeding terminal 110 is integrally formed with the radiator 200, and a free end of the feeding terminal 110 is electrically connected to the feeding module of the mainboard 100 via a spring piece or pogo pin on the mainboard 100, where the position at which the feeding terminal 110 is connected to the mainboard 100 forms the feeding point 111.

With continued reference to FIG. 1, in this implementation, only one first grounding terminal 120 is illustrated as an example. The first grounding terminal 120 is connected across the gap formed between the mainboard 100 and the radiator 200, that is, one end of the first grounding terminal 120 is electrically connected to the radiator 200, and the other end of the first grounding terminal 120 is connected to the grounding module of the mainboard 100. It can be understood that, the grounding terminal 120 and the radiator 200 can be separately formed or integrally formed, which is not limited in the present disclosure.

The first grounding terminal 120 is connected with the inductor 121, and the radiator 200 is grounded via the inductor 121. The inductor 121 is disposed on the mainboard 100. One end of the inductor 121 is connected to an end of the first grounding terminal 120, and the other end of the inductor 121 is connected to the grounding module of the mainboard 100.

It can be understood that, there can be a plurality of first grounding terminals 120, and the scheme in which there are a plurality of the first grounding terminals 120 will be described in detail below in the present disclosure, and will not be detailed herein.

For the circularly polarized antenna with the annular radiator, an effective perimeter of the radiator is equal to a wavelength corresponding to a central operating frequency of the antenna. Therefore, in the case of implementing an antenna with a different frequency, it is necessary to set the effective perimeter of the radiator equal to the wavelength corresponding to that different frequency.

A physical perimeter around the radiator 200 is the effective perimeter of the radiator 200 in free space. However, in some assembled states, assembly structures and materials around the radiator 200 increase the effective perimeter of the radiator, and reduce a resonant frequency of the radiator. For example, in the case that the radiator 200 is assembled with a plastic material (e.g., a plastic bracket or a nano-molded material), the material increases the effective perimeter of the radiator. Meanwhile, a screen assembly near the radiator 200, such as a glass cover of the screen assembly, also has an effect of increasing the effective perimeter of the radiator.

The effective perimeter of the radiator 200 is increased because dielectric constants of both the plastic material and the glass cover are greater than that of air, where the dielectric constants of the plastic and the nano-molded materials are typically 2-3, and the dielectric constant of the glass cover is typically 6-8, and the introduction of materials with high dielectric constants increases a current intensity in the vicinity of the radiator 200, which in turn increases the effective perimeter of the radiator 200. That is, the actual physical perimeter of the radiator 200 can be reduced in condition of achieving a same resonant frequency by the radiator 200. Therefore, it can be understood that, the term "effective perimeter" in the embodiments of the present disclosure refers to an effective electrical length of the radiator during the actual production of the resonant electric waves, and is not limited to being interpreted as a physical length.

In some implementations, the radiator 200 has a circular ring structure. In other implementations, the radiator 200 has any other ring structure suitable for implementation, such as an elliptical ring, a triangular ring, a diamond ring, a rectangular ring, a rounded rectangular ring, or another polygonal ring, which is not limited in the present disclosure. In this case, the peripheral shape of the mainboard changes with the shape of the radiator, so as to keep the peripheral shape of the mainboard always similar to the shape of the radiator.

At least one inventive concept of the antenna structure in the present disclosure is to produce a circularly polarized wave by directly feeding the annular radiator 200 and pulling the current generated by the radiator 200 with the grounded inductor 121 to form a circulating current being rotated. Compared with a linearly polarized antenna, the circularly polarized antenna has a higher reception efficiency and is resistant to multipath, resulting in more accurate positioning in implementing a satellite positioning function. In addition, by directly feeding the annular radiator without providing other coupling antenna structures, structure and cost of the circularly polarized antenna can be greatly simplified, making it easier to be implemented in devices with small volume and space such as watches. Moreover, the effective electrical length of the antenna can be reduced by the grounded inductor, such that a larger-sized antenna can be used to achieve a higher operating frequency, providing more possibilities for the design of the circularly polarized antenna. For example, when the antenna according to the present disclosure is used to implement a GPS antenna for satellite positioning, the scheme in the present disclosure is applicable to the case where the original or inherent resonant frequency of the antenna radiator itself is less than the operating frequency of GPS that is 1.575 GHz.

In the above implementations, circular polarization is realized by directly feeding the radiator and pulling the current generated by the radiator with the grounded inductor. In some implementations, the current generated by the radiator can also be pulled with a grounded capacitor to form a circulating current in the radiator that is rotated with time or phase, thereby realizing circular polarization.

Figure 2:
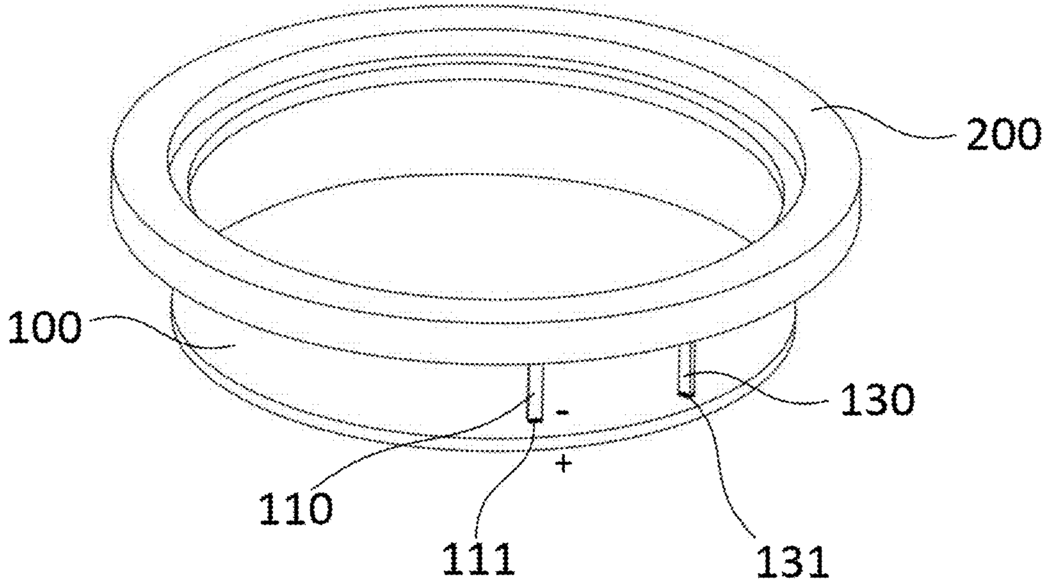
FIG. 2 is a schematic diagram of a circularly polarized antenna structure according to alternative implementations of the present disclosure.

FIG. 2 is a schematic diagram of a circularly polarized antenna structure according to alternative implementations of the present disclosure. As shown in FIG. 2, the antenna structure is grounded via a capacitor 131 using a second grounding terminal 130. Reference can be made to the aforementioned implementation in FIG. 1 for other aspects of this implementation not described herein.

In some implementations, only one second grounding terminal 130 is illustrated in FIG. 2. In other implementations, there are a plurality of second grounding terminals 130. Moreover, the second grounding terminal 130 and the first grounding terminal 120 can be provided in the same antenna structure. That is to say, both the capacitor and the inductor can be provided in the same antenna structure, which will be described in detail below in the present disclosure, and will not be detailed herein.

The realization of circular polarization by the capacitor and the inductor, and the effects of the capacitor and the inductor on the antenna performance, as well as the design of the antenna in the implementations of the present disclosure will be compared and explained below.

The implementation of the circularly polarized antenna in the implementations of the present disclosure will be described based on the antenna structures shown in FIG. 1 and FIG. 2. The circularly polarized antenna can be implemented in two manners. In the first manner, the circulating current being rotated, which is produced in the case of the effective perimeter of the radiator being the wavelength corresponding to the operating frequency of the antenna, forms circular polarization. In the second manner, two linear currents, which are mutually quadrature and have equal amplitudes and a phase difference of 90°, form circular polarization. The circularly polarized antenna in the implementations of the present disclosure is implemented in the first manner. For the radiator 200 with the effective perimeter being the wavelength corresponding to the operating frequency of the antenna, in the implementations of the present disclosure, a rotating current field that is rotated in a single direction is formed inside the radiator by directly feeding the radiator 200 and effectively pulling the generated current using the inductor 121 and/or the capacitor 131, thereby producing the circularly polarized waves.

Figure 3:
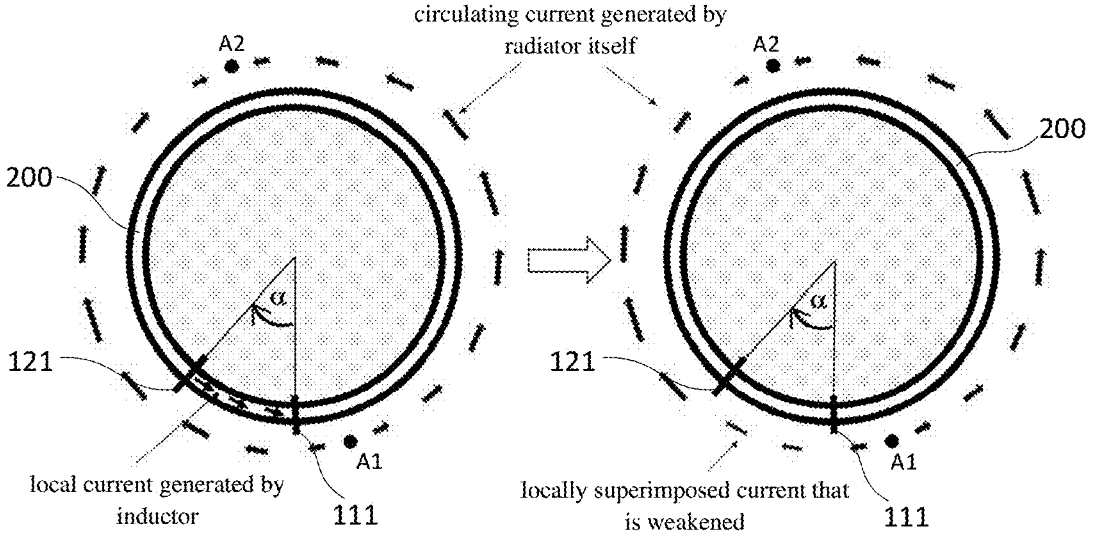
FIG. 3 is a schematic diagram illustrating a circularly polarized antenna structure according to some implementations of the present disclosure.

On the basis of realizing circular polarization, the inductor 121 and the capacitor 131 also affect the effective electrical length of the antenna structure. FIG. 3 illustrates a current distribution of the antenna structure in FIG. 1. The grounding manner via the inductor will be described below in conjunction with FIG. 3.

First of all, a line connected between the feeding terminal 110 or the feeding point 111 and a center point of the radiator 200 is defined as a first connecting line, a line connected between the first grounding terminal 120 or the inductor 121 and the center point of the radiator 200 is defined as a second connecting line, a clockwise direction around the radiator 200 is defined as a first direction, and an included angle formed from the first connecting line to the second connecting line along the first direction is defined as a first included angle α, i.e., the first included angle α is formed along the clockwise direction.

As shown in FIG. 3, after the antenna structure is fed, because the effective perimeter of the radiator 200 is the wavelength corresponding to the operating frequency for realizing the circular polarization, the rotated circulating current produced in the radiator 200 has two current zero points A1 and A2, and an instantaneous current distribution is shown by an arrow around the radiator 200. Since the phase of the current across the inductor lags behind the phase of the voltage across the inductor in an AC circuit, a local current in a direction opposite to the current generated by the radiator 200 is generated between the inductor 121 and the feeding point 111. The local current generated by the inductor 121 is superimposed on the current generated by the radiator 200 itself to locally weaken the current generated by the radiator 200, and the current intensity of the radiator 200 is proportional to its effective electrical length, thus the local current causes the effective electrical length of the radiator 200 to be reduced. In addition, since the resonant frequency of the radiator 200 is inversely proportional to its effective electrical length, that is, the greater the effective electrical length, the lower the resonant frequency, the resonant frequency of the radiator 200 is shifted towards higher frequencies.

In an example, taking a GPS antenna for satellite positioning as an example, the GPS antenna has a central operating frequency of 1.575 GHz, and the original or inherent resonant frequency of the radiator 200 is less than 1.575 GHz before the inductor 121 is applied.

Figure 4:
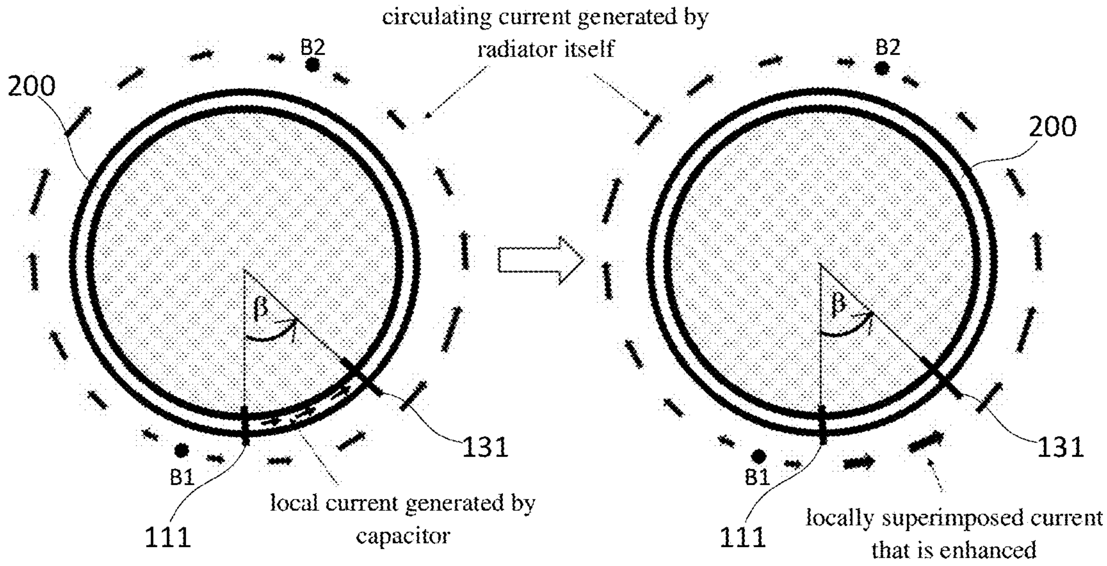
FIG. 4 is a schematic diagram illustrating a circularly polarized antenna structure according to alternative implementations of the present disclosure.

FIG. 4 illustrates a current distribution of the antenna structure in FIG. 2. The grounding manner via the capacitor will be described below in conjunction with FIG. 4.

Similarly, a line connected between the feeding terminal 110 or the feeding point 111 and a center point of the radiator 200 is defined as a first connecting line, a line connected between the second grounding terminal 130 or the capacitor 131 and the center point of the radiator 200 is defined as a third connecting line, a counterclockwise direction around the radiator 200 is defined as a second direction, and an included angle formed from the first connecting line to the third connecting line along the second direction is defined as a second included angle β, i.e., the second included angle β is formed along the counterclockwise direction.

As shown in FIG. 4, after the antenna structure is fed, because the effective perimeter of the radiator 200 is the wavelength corresponding to the operating frequency, the rotated circulating current produced in the radiator 200 has two current zero points B1 and B2, and an instantaneous current distribution is shown by an arrow around the radiator 200. Since the phase of the current across the capacitor is ahead of the phase of the voltage across the capacitor in an AC circuit, a local current is generated between the feeding point 111 and the capacitor 131 in the same direction as the current generated by the radiator 200. The local current generated by the capacitor 131 is superimposed on the current generated by the radiator 200 itself to locally enhance the current generated by the radiator 200, and the current intensity of the radiator 200 is directly proportional to its effective electrical length, thus the local current causes the effective electrical length of the radiator 200 to be increased. In addition, since the resonant frequency of the radiator 200 is inversely proportional to its effective electrical length, that is, the greater the effective electrical length, the lower the resonant frequency, the resonant frequency of the radiator 200 is shifted towards lower frequencies.

In an example, still taking a GPS antenna for satellite positioning as an example, the GPS antenna has a central operating frequency of 1.575 GHz, and the original or inherent resonant frequency of the radiator 200 is greater than 1.575 GHz before the capacitor 131 is applied.

The following conclusion can be drawn from the above. On the basis of realizing the circular polarization, the effective electrical length of the antenna can be reduced by using the grounded inductor, while the effective electrical length of the antenna can be increased by using the grounded capacitor. Based on this conclusion, more design options are possible in designing antennas. For example, a circularly polarized antenna with a higher frequency can be realized by using the grounded inductor in the case of a larger effective perimeter or diameter of a watch. For another example, a circularly polarized antenna with a lower frequency can be realized by using the grounded capacitor in the case of a smaller effective perimeter or diameter of a watch.

The aforementioned implementation schemes in the related art are essentially equivalent to realizing circular polarization by means of coupled capacitor grounding. Therefore, these schemes are applicable only to the case where the original resonant frequency of the radiator is greater than the operating frequency, but not applicable to the case where the original resonant frequency of the radiator is less than the operating frequency. However, the implementations of the present disclosure are applicable to the case where the original resonant frequency of the radiator is less than the operating frequency by means of the grounding via inductor, so as to implement a circularly polarized antenna with a higher frequency. For example, when the antenna structure of the present disclosure is used to implement the GPS antenna for satellite positioning, the grounding via the inductor or the capacitor, and the combined grounding via the inductor and the capacitor in the implementations of the present disclosure are applicable to the case where the original resonant frequency of the radiator is greater than or less than the operating frequency of GPS that is 1.575 GHz. That is to say, the scheme provided in the present disclosure has stronger adaptability and flexibility.

On the basis of the foregoing, the influence of positions of the capacitor and the inductor on the circularly polarized antenna will be further explained below. With reference to FIG. 3 and FIG. 4, since the radiator 200 has a ring structure, the position of the inductor 121 is indicated by the first included angle α, and the position of the capacitor 131 is indicated by the second included angle β. It should be noted in particular that the first included angle α and the second included angle β here are indicated in opposite directions.

First of all, since the condition that the annular radiator realizes circular polarization is that the effective perimeter of the radiator is equal to the wavelength corresponding to the operating frequency, it can be seen from the current distribution of the resonant wave that, there are two current zero points and two current peaks on the entire circumference, which can also be seen from FIGS. 3 and 4. Therefore, at a certain moment, the entire circumference of the radiator can be divided into four regions according to the current distribution, which are:

$$\left(0, \frac{\pi}{2}\right),$$

in which the current reaches a peak value at 90° from zero at 0°;

$$\left(\frac{\pi}{2}, \pi\right),$$

in which the current crops to zero at 180° from the peak value at 90°;

$$\left(\pi, \frac{3\pi}{2}\right),$$

in which the current reaches a peak value at 270° from zero at 180°; and $$\left(\frac{3\pi}{2}, 2\pi\right),$$

in which the current drops to zero at 360° from the peak value at 270°.

The above current distribution is a periodic current change distribution, which periodically rotates in the annular radiator over time under the effect of the inductor 121 and the capacitor 131, such that the circularly polarized wave as described above is formed. Moreover, if the current is rotated in a clockwise direction in the radiator, a left-hand circularly polarized wave is produced, and if the current is rotated in a counterclockwise direction in the radiator, a right-hand circularly polarized wave is produced.

As shown in FIG. 3, the current in the radiator 200 is rotated under the effect of the inductor 121. Taking the feeding point 111 as the 0° point, if the first included angle α satisfies:

$$\alpha \in \left(0, \frac{\pi}{2}\right),$$

the current is "pulled" to rotate counterclockwise; and on the contrary, if the first included angle α satisfies:

$$\alpha \in \left(\frac{3\pi}{2}, 2\pi\right),$$

the current is "pulled" to rotate clockwise. This is due to the fact that the phase of the current across the inductor 121 lags behind the phase of the voltage across the inductor 121 in an AC circuit. Therefore, when the first included angle α satisfies:

$$\alpha \in \left(0, \frac{\pi}{2}\right),$$

the above lag in the phase of the current across the inductor 121 causes the current in the annular radiator 200 to rotate in the counterclockwise direction, thereby realizing a right-hand circularly polarized antenna. Similarly, when the first included angle α satisfies:

$$\alpha \in \left(\frac{3\pi}{2}, 2\pi\right),$$

the lag in the phase of the current across the inductor 121 causes the current in the annular radiator 200 to rotate in the clockwise direction, thereby realizing a left-hand circularly polarized antenna.

Meanwhile, combined with the characteristic that, in the presence of the circularly polarized wave in the annular radiator, the circulating current producing the circularly polarized wave has a periodic distribution on the entire circumference of the radiator, it can be known that the circularly polarized antenna shown in FIG. 3 satisfies the following rules: if the first included angle α satisfies:

$$\alpha \in \left(0, \frac{\pi}{2}\right) \cup \left(\pi, \frac{3\pi}{2}\right),$$

the current rotates counterclockwise to produce a right-hand circularly polarized wave; while if the first included angle α satisfies:

$$\alpha \in \left(\frac{\pi}{2}, \pi\right) \cup \left(\frac{3\pi}{2}, 2\pi\right),$$

the current rotates clockwise to produce a left-hand circularly polarized wave, where "U" denotes a union of the two sets.

Based on the above rules, a left-hand circularly polarized antenna or right-hand circularly polarized antenna can be realized by providing the inductor 121 at different positions. For example, in an example, if the GPS antenna is implemented using the antenna structure shown in FIG. 3, the inductor 121 is provided at a position in the interval of the first included angle $$\alpha \in \left(0, \frac{\pi}{2}\right) \cup \left(\pi, \frac{3\pi}{2}\right),$$

so as to realize a right-hand circularly polarized antenna.

As shown in FIG. 4, the current in the radiator 200 is rotated under the effect of the capacitor 131. Taking the feeding point 111 as the 0° point, if the second included angle β satisfies:

$$\beta \in \left(0, \frac{\pi}{2}\right),$$

the current is "pulled" to rotate counterclockwise; and on the contrary, if the second included angle β satisfies:

$$\beta \in \left(\frac{3\pi}{2}, 2\pi\right),$$

the current is "pulled" to rotate clockwise. This is due to the fact that the phase of the current across the capacitor 131 is in advance of the phase of the voltage across the capacitor 131 in an AC circuit. Therefore, when the second included angle β satisfies:

$$\beta \in \left(0, \frac{\pi}{2}\right),$$

the above phase advance causes the current in the annular radiator 200 to rotate in the counterclockwise direction, thereby realizing a right-hand circularly polarized antenna. Similarly, when the second included angle β satisfies:

$$\beta \in \left(\frac{3\pi}{2}, 2\pi\right),$$

the advance in the phase of the current across the capacitor 131 causes the current in the annular radiator 200 to rotate in the clockwise direction, thereby realizing a left-hand circularly polarized antenna.

Meanwhile, combined with the characteristic that, in the presence of the circularly polarized wave in the annular radiator, the circulating current producing the circularly polarized wave has a periodic distribution on the entire circumference of the radiator, it can be known that the circularly polarized antenna shown in FIG. 4 satisfies the following rules: if the second included angle β satisfies:

$$\beta \in \left(0, \frac{\pi}{2}\right) \cup \left(\pi, \frac{3\pi}{2}\right),$$

the current rotates counterclockwise to produce a right-hand circularly polarized wave; while if the second included angle β satisfies:

$$\beta \in \left(\frac{\pi}{2}, \pi\right) \cup \left(\frac{3\pi}{2}, 2\pi\right),$$

the current rotates clockwise to produce a left-hand circularly polarized wave, where "U" denotes a union of the two sets.

Based on the above rules, a left-hand circularly polarized antenna or right-hand circularly polarized antenna can be realized by providing the capacitor 131 at different positions. For example, in an example, if the GPS antenna is implemented using the antenna structure shown in FIG. 4, the capacitor 131 is provided at a position in the interval of the second included angle $$\beta \in \left(0, \frac{\pi}{2}\right) \cup \left(\pi, \frac{3\pi}{2}\right),$$

so as to realize a right-hand circularly polarized antenna. The relationship between the first included angle α (grounding manner via inductor) and the circular polarization direction of the antenna, and the relationship between the second included angle β (grounding manner via capacitor) and the circular polarization direction of the antenna are shown in Table 1.

TABLE 1

| first included angle $\alpha$ | 0°~90° | 90°~180° | 180°~270° | 270°~360° |
|---|---|---|---|---|
| circular polarization direction | right-hand | left-hand | right-hand | left-hand |
| second included angle $\beta$ | 0°~90° | 90°~180° | 180°~270° | 270°~360° |
| circular polarization direction | right-hand | left-hand | right-hand | left-hand |

Based on the above and periodicity of circularly polarized current distribution, in some examples of the design of the circularly polarized antenna according to the present disclosure, the effect of circular polarization produced by applying an inductor $L_0$ to ground at the position of the first included angle $\alpha_0$ is equivalent to the effect of circular polarization produced by applying the inductor $L_0$ to ground at the position of the first included angle ($\alpha_0$+180°); and the effect of circular polarization produced by applying a capacitor $C_0$ to ground at the position of the second included angle $\beta_0$ is equivalent to the effect of circular polarization produced by applying the capacitor $C_0$ to ground at the position of the second included angle ($\beta_0$+180°).

The effect of applying two inductors (or two capacitors) simultaneously on the circularly polarized antenna will be described below.

On the basis of FIG. 1, two first grounding terminals 120 are grounded, each first grounding terminal 120 being connected to the grounding module of the mainboard 100 of the device via an inductor 121. One inductor with an inductance value of $2L_0$ is provided at the position of the first included angle $\alpha_0$, and the other inductor with an inductance value of $2L_0$ is provided at the position of the first included angle ($\alpha_0$+180°). Based on the above, circular polarizations produced by the two inductors have a same direction, and the two inductors are connected in parallel. The following equation can be obtained according to the characteristics of inductors in parallel.

$$\frac{1}{L} = \frac{1}{2L_0} + \frac{1}{2L_0} = \frac{1}{L_0} \tag{1}$$

In the equation (1), L denotes the inductance value of an equivalent inductor. The equation (1) shows that the effect of circular polarizations produced by two inductors with an inductance value of $2L_0$ respectively provided at the positions of $\alpha_0$ and ($\alpha_0$+180°) is equivalent to that produced by an inductor with an inductance value of $L_0$ provided at the position of $\alpha_0$ or ($\alpha_0$+180°).

On the basis of FIG. 1, two second grounding terminals 130 are grounded, each second grounding terminal 130 being connected to the grounding module of the mainboard 100 of the device via a capacitor 131. One capacitor with a capacitance value of $0.5C_0$ is provided at the position of the second included angle $\beta_0$, and the other capacitor with a capacitance value of $0.5C_0$ is provided at the position of the second included angle ($\beta_0$+180°). Based on the above, circular polarizations produced by the two capacitors have a same direction, and the two capacitors are connected in parallel. The following equation can be obtained according to the characteristics of capacitors in parallel.

$$C=0.5C_0+0.5C_0=C_0 \tag{2}$$

In the equation (2), C denotes the capacitance value of an equivalent capacitor. The equation (2) shows that the effect of circular polarizations produced by two capacitors with a capacitance value of $0.5C_0$ respectively provided at the positions of $\beta_0$ and ($\beta_0$+180°) is equivalent to that produced by a capacitor with a capacitance value of $C_0$ provided at the position of $\beta_0$ or ($\beta_0$+180°).

On the basis of this, in some other examples of the design of the circularly polarized antenna according to the present disclosure, the effect of circular polarization produced by an inductor with an inductance value of $L_0$ provided at the position of the first included angle $\alpha_0$ or ($\alpha_0$+180°) is equivalent to that produced by inductors with an inductance value of $2L_0$ respectively applied at the positions of $\alpha_0$ and ($\alpha_0$+180°); and the effect of circular polarization produced by a capacitor with a capacitance value of $C_0$ provided at the position of the second included angle $\beta_0$ or ($\beta_0$+180°) is equivalent to that produced by capacitors with a capacitance value of $0.5C_0$ respectively applied at the positions of $\beta_0$ and ($\beta_0$+180°).

In some implementations, an equivalent circularly polarized antenna can be designed using two capacitors or two inductors, thus providing more design forms of the antenna.

The effect of the inductance value (or capacitance value) and the position of the inductor (or capacitor) on the circularly polarized antenna will be further described below. Based on this, the effect of the position distribution of multiple inductors (or capacitors) with different inductance values (or capacitance values) on the circular polarization of the antenna can be calculated.

Axial ratio (AR) is an important parameter to characterize the performance of the circularly polarized antenna. AR refers to a ratio of two quadrature electric field components of the circularly polarized wave. The smaller the AR, the better the circular polarization performance; and on the contrary, the larger the AR, the worse the circular polarization performance. In the implementations of the present disclosure, an indicator of the performance of the circularly polarized antenna is that the AR should be less than 3 dB.

For the annular radiator 200, different inductors or capacitors are applied at a certain angular position, and by adjusting the inductance value of the inductor or the capacitance value of the capacitor, it is possible to obtain the optimum axis ratio at that position, which corresponds to the optimum frequency of the antenna.

Figure 5:
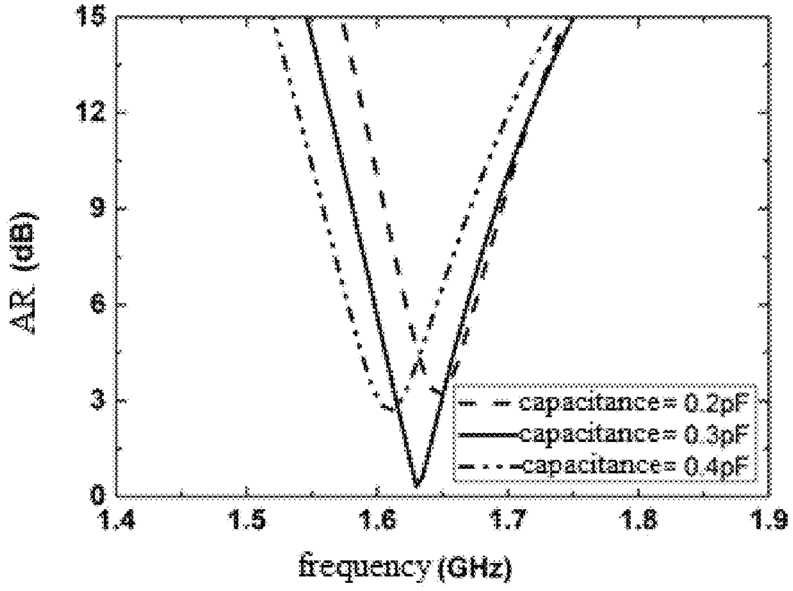
FIG. 5 is a graph illustrating changes in an axial ratio of an antenna with a capacitance according to an implementation of the present disclosure.

In an example, the original resonant frequency of the radiator 200 without inductors and capacitors being applied is 1.69 GHz. FIG. 5 illustrates a graph of changes in an axial ratio of an antenna when capacitors with capacitance values of 0.2 pF, 0.3 pF, and 0.4 pF are respectively applied at the position of the second included angle $\beta$=45°. It can be seen from FIG. 5 that when the capacitance value is 0.3 pF, the axis ratio of the circular polarization of the antenna reaches the optimum at the frequency of 1.63 GHz. In this case, the capacitance value of the capacitor being 0.3 pF is defined as the optimum capacitance value at this second included angle, and the frequency of 1.63 GHz corresponding to the optimum axis ratio is defined as the optimum frequency at this second included angle.

Based on the above example, optimum frequencies (GHz) and optimum capacitance values (pF) of the capacitor at different angles can be obtained respectively, and some examples are given in Table 2.

TABLE 2

| second included angle β | 10° | 20° | 30° | 45° | 60° |
|---|---|---|---|---|---|
| optimum frequency | 1.68 | 1.665 | 1.645 | 1.63 | 1.56 |
| optimum capacitance value | 0.8 | 0.5 | 0.4 | 0.3 | 0.5 |

It can be seen from Table 2 that, when the second included angle β is 45°, the optimum capacitance value required is the minimum, and as the second included angle β gradually increases or decreases, the optimum capacitance value required gradually increases. Moreover, the larger the second included angle β is, the lower the optimum frequency is. Since the optimum frequency is a function of the second included angle β and the capacitance value, the following equation is defined.

$$P_0 = C_0 * \beta_0 \quad (3)$$

In the equation (3), $C_0$ denotes the capacitance value of the capacitor, $\beta_0$ denotes the second included angle, and $P_0$ denotes a capacitor pulling capacity of the capacitor with the capacitance value of $C_0$ at the position of the second included angle $\beta_0$. The "capacitor pulling capacity" as defined means the capacity of an applied capacitor in pulling the current in the annular radiator 200 to rotate to form the circular polarization. It is the presence of the capacitor pulling capacity that allows the antenna to form a circularly polarized antenna with an axis ratio of less than 3 dB by applying appropriate capacitors at different second included angles $\beta_0$. Moreover, the greater the capacitor pulling capacity, the greater the shift of the optimum frequency of the antenna towards lower frequencies.

It should be noted in particular that in some examples of the present disclosure, since the radiator 200 has a shape of a circular ring, and the second included angle $\beta_0$ is always proportional to its corresponding arc length, the position of the capacitor can be denoted by the angle of the second included angle $\beta_0$. While in the case of radiators with other shapes, the position of the capacitor can be denoted by the length of the radiator corresponding to the second included angle $\beta_0$, i.e., $\beta_0$ in the equation (3) can be denoted by the length of the radiator between the capacitor and the feeding point.

In addition, as can be learnt in combination with the foregoing, applying a capacitor at the position of $\beta_0$ is equivalent to applying the same capacitor at the position of ($\beta_0$+180°). Thus in the equation (3), $\beta_0$ can be in the range of 0° to 180°, and when $\beta_0$ is greater than 180°, 180° can be subtracted from $\beta_0$ so as to make it fall within the range of 0° to 180°. Similarly, in the case of a non-circular radiator, the length of the radiator is also the corresponding length of the radiator when $\beta_0 \in$ (0°, 180°).

Moreover, as can be learnt from the foregoing, the circular polarization direction in the case of the second included angle $\beta_0$ within 0° to 90° is opposite to the circular polarization direction in the case of the second included angle $\beta_0$ within 90° to 180°. In order to facilitate understanding and avoid interference between multiple capacitors in intervals with different circular polarization directions, the second included angle $\beta_0$ in the following is defined as belonging to the interval from 0° to 90°, i.e., multiple capacitors all produce right-hand circular polarization.

In some implementations, the capacitor pulling capacity can be split into two or more different components of the capacitor pulling capacity, i.e., applying a capacitor with a capacitance value of $C_0$ at the position of the second included angle $\beta_0$ is equivalent to applying a capacitor with a capacitance value of $C_1$ at the position of the second included angle $\beta_1$, a capacitor with a capacitance value of $C_2$ at the position of the second included angle $\beta_2$, a capacitor with a capacitance value of $C_3$ at the position of the second included angle $\beta_3$, . . . , respectively.

Figure 6:
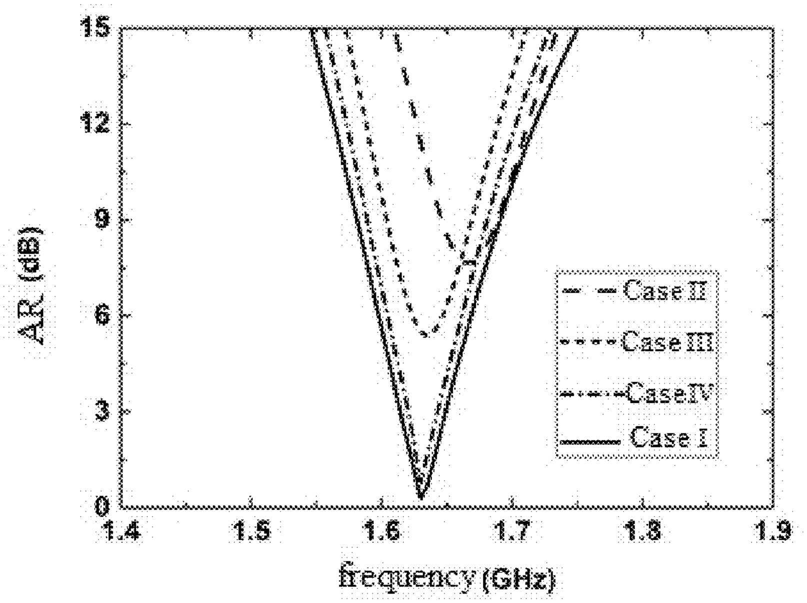
FIG. 6 is a graph illustrating changes in an axial ratio of an antenna according to an implementation of the present disclosure.

In an example, a graph of changes in an axial ratio of a circularly polarized antenna is shown in FIG. 6 for the following four cases:

Case I: the second included angle $\beta_0$=45°, and the capacitance value $C_0$=0.3 pF;

Case II: the second included angle $\beta_1$=30°, and the capacitance value $C_1$=0.13 pF;

Case III: the second included angle $\beta_2$=50°, and the capacitance value $C_2$=0.19 pF; and Case IV: combining case II and case III.

As can be seen from FIG. 6, when the capacitors in case II and case III are applied separately, the axis ratios differ greatly from that in case I. However, when the capacitors in case II and case III are applied simultaneously, i.e., in case IV, it can be seen that the axial ratio and optimum frequency are very close to those in case I.

FIG. 6 shows that applying a capacitor at a certain position is equivalent to applying multiple capacitors with different capacitance values to different positions, and in fact, the sum of the pulling capacities of the multiple capacitors is roughly equivalent to the pulling capacity of an equivalent capacitor. According to this experience, the following equation can be obtained.

$$C_0 * \beta_0 \approx C_1 * \beta_1 + C_2 * \beta_2 + \ldots + C_N * \beta_n \quad (4)$$

Two ends of the equation (4) are strictly equal in some implementations. For example, when two capacitors are respectively provided at two positions of $\beta_0$ and ($\beta_0$+180°), the two positions are exactly equivalent, and the optimum frequencies are also exactly the same when the same capacitors are applied at these two particular positions. However, when multiple capacitors are applied at other different positions, the two ends of the equation (4) have a very approximate relationship.

For example, in the condition that, the parameters in the above case I and case II are fixed, as well as the angle in the case III is fixed, by using the equation (4), the capacitance value $C_2$ for the case III can be calculated as 0.192 pF, which is very close to the capacitance value $C_2$ of 0.19 pF used in the case IV. This can also indicate that the above equation (4) can be used to guide the design of the circularly polarized antenna with multiple capacitors, and the corresponding position and capacitance value of the capacitor can be quickly determined and selected by using the equation (4).

In the implementations of the present disclosure, through the description of the scheme for multiple capacitors, more design forms of the circularly polarized antenna can be provided on the one hand, and electrostatic protection for the antenna structure can be realized on the other hand, as will be briefly described below.

TVS (Transient Voltage Suppressor) is an electrostatic protection device, and when two poles of the TVS are subjected to reverse transient high-energy shock, the TVS can change a high impedance between the two poles to a lower impedance, thereby effectively protecting precision components in electronic circuits.

TVS is a device that exhibits a certain capacitance value, i.e., TVS per se has a certain parasitic capacitance. At the antenna frequencies discussed in the present disclosure, the TVS can be equivalent to a capacitor with a capacitance value of 0.13 pF. Therefore, in some examples of the antenna structure of the present disclosure, one or more TVS can be used as one or more of the second grounding terminals, i.e., the TVS is used as one of the capacitors, or a capacitor with a capacitance value of 0.13 pF is considered as a TVS. For example, the capacitor in the above case II can be considered as a TVS. If the capacitance value and position of this TVS are fixed, the positions and capacitance values of the other one or more capacitors can be quickly calculated according to the above equation (4). This can provide effective electrostatic protection for the circularly polarized antenna in addition to realizing the circularly polarized antenna, and multiple TVS can be used in order to achieve a better electrostatic protection effect.

In some implementations, in order to keep the direction of the circularly polarized antenna unchanged, the above-mentioned multiple capacitors are located in intervals with a same circular polarization direction. For example, in the case of right-hand circular polarization, all of the second included angles β of the multiple capacitors are possibly located in the interval of 0° to 90° and the interval of 180° to 270°. However, during the calculation using the equation (4), it is also necessary to convert the second included angle β to the range of 0°~180°, which has been explained above.

The implementation and structure of the circularly polarized antenna realized by multiple capacitors have been described above. On this basis, according to the characteristics of inductors in parallel, an inductor at a certain position can also be equivalent to multiple inductors with different inductance values and/or at different positions connected in parallel.

Figure 7:
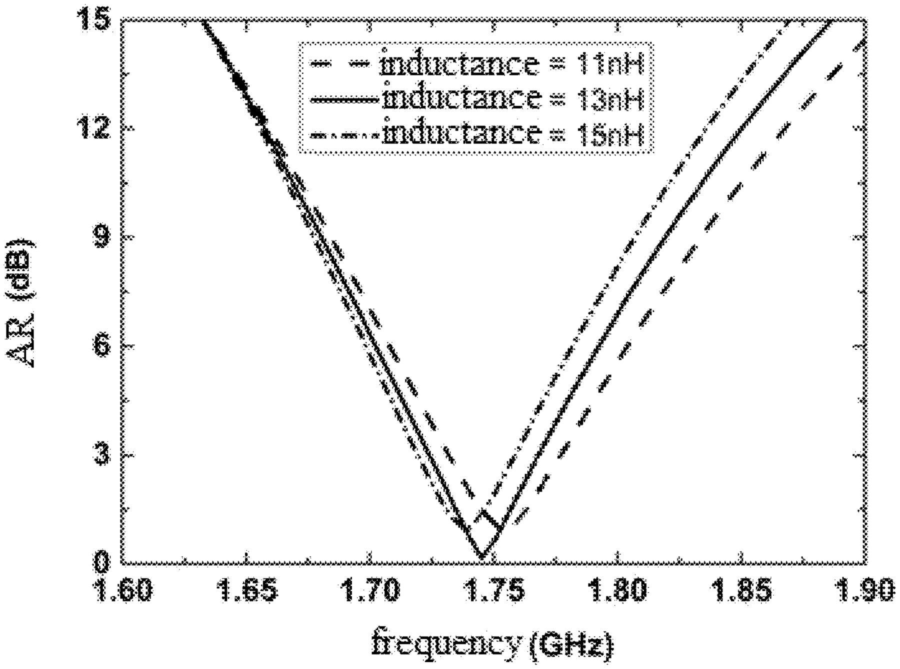
FIG. 7 is a graph illustrating changes in an axial ratio of an antenna with an inductance according to an implementation of the present disclosure.

In an example, the original resonant frequency of the radiator 200 without inductors and capacitors being applied is 1.69 GHz. FIG. 7 illustrates a graph of changes in an axial ratio of an antenna when inductors with inductance values of 11 nH, 13 nH, and 15 nH are respectively applied at the position of the first included angle α=45°. It can be seen from FIG. 7 that, when the inductance value is 13 nH, the axis ratio of the circular polarization of the antenna reaches the optimum at the frequency of 1.745 GHz. In this case, the inductance value of the inductor being 13 nH is defined as the optimum inductance value at this first included angle, and the frequency of 1.745 GHz corresponding to the optimum axis ratio is defined as the optimum frequency at this first included angle.

Based on the above example, optimum frequencies (GHz) and optimum inductance values (nH) of the inductor at different angles are obtained respectively, and some examples are given in Table 3.

TABLE 3

| first included angle α | 10° | 20° | 30° | 45° | 60° |
|---|---|---|---|---|---|
| optimum frequency | 1.70 | 1.71 | 1.72 | 1.745 | 1.785 |
| optimum inductance value | 4 | 8 | 11 | 13 | 11 |

It can be seen from Table 3 that, when the first included angle α is 45°, the optimum inductance value required is the maximum, and as the first included angle α gradually increases or decreases, the optimum inductance value required gradually decreases. Moreover, the larger the first included angle α is, the higher the optimum frequency is. Since the optimum frequency is a function of the first included angle α and the inductance value, the following equation is defined.

$$Q_0 = L_0 * \alpha_0 \qquad (5)$$

In the equation (5), $L_0$ denotes the inductance value of the inductor, $\alpha_0$ denotes the first included angle, and $Q_0$ denotes an inductor pulling capacity of the inductor with the inductance value of $L_0$ at the position of the first included angle $\alpha_0$. The "inductor pulling capacity" as defined means the capacity of an applied inductor in pulling the current in the annular radiator 200 to rotate to form the circular polarization. It is the presence of the inductor pulling capacity that allows the antenna to form a circularly polarized antenna with an axis ratio of less than 3 dB by applying appropriate inductors at different first included angles $\alpha_0$. Moreover, the greater the inductor pulling capacity, the greater the shift of the optimum frequency of the antenna towards higher frequencies.

It should be noted in particular that in the examples of the present disclosure, since the radiator 200 has a shape of a circular ring, and the first included angle $\alpha_0$ is always proportional to its corresponding arc length, the position of the inductor can be denoted by the angle of the first included angle $\alpha_0$. While in the case of radiators with other shapes, the position of the inductor can be denoted by the length of the radiator corresponding to the first included angle $\alpha_0$, i.e., $\alpha_0$ in the equation (5) can be denoted by the length of the radiator between the inductor and the feeding point.

In addition, as can be learnt in combination with the foregoing, applying an inductor at the position of $\alpha_0$ is equivalent to applying the same inductor at the position of ($\alpha_0$+180°). Thus in the equation (5), $\alpha_0$ can be in the range of 0° to 180°, and when $\alpha_0$ is greater than 180°, 180° can be subtracted from $\alpha_0$ so as to make it fall within the range of 0° to 180°. Similarly, in the case of a non-circular radiator, the length of the radiator is also the corresponding length of the radiator when $\alpha_0 \in$ (0°, 180°).

Moreover, as can be learnt from the foregoing, the circular polarization direction in the case of the first included angle $\alpha_0$ within 0° to 90° is opposite to the circular polarization direction in the case of the first included angle $\alpha_0$ within 90° to 180°. In order to facilitate understanding and avoid interference between multiple inductors in intervals with different circular polarization directions, the first included angle $\alpha_0$ in the following is defined as belonging to the interval from 0° to 90°, i.e., multiple inductors all produce right-hand circular polarization.

In some implementations, the inductor pulling capacity can be split into two or more different components of the inductor pulling capacity, i.e., applying an inductor with an inductance value of $L_0$ at the position of the first included angle $\alpha_0$ is equivalent to applying an inductor with an inductance value of $L_1$ at the position of the first included angle $\alpha_1$, an inductor with an inductance value of $L_2$ at the position of the first included angle $\alpha_2$, an inductor with an inductance value of $L_3$ at the position of the first included angle $\alpha_3$, . . . , respectively. In combination with the characteristics of inductors in parallel in the equation (1), the following empirical equation can be obtained.

$$\frac{1}{L_0 * \alpha_0} \approx \frac{1}{L_1 * \alpha_1} + \frac{1}{L_2 * \alpha_2} + \ldots + \frac{1}{L_n * \alpha_n} \qquad (6)$$

Two ends of the equation (6) are strictly equal in some implementations. For example, when two inductors are respectively provided at two positions of $\alpha_0$ and ($\alpha_0$+180°), the two positions are exactly equivalent, and the optimum frequencies are also exactly the same when the same inductors are applied at these two particular positions. However, when multiple inductors are applied at other different positions, the two ends of the equation (6) have a very approximate relationship. Under the guidance of the equation (6), more design forms of the circularly polarized antenna can be realized.

As can be learnt from the above detailed description of design schemes for multiple capacitors and multiple inductors, in some other examples of the design of the circularly polarized antenna according to the present disclosure, the effect of circular polarization produced by applying multiple inductors at different positions and with different inductance values in intervals with the same circular polarization direction is equivalent to the effect of circular polarization produced by applying an inductor at a fixed position; and the effect of circular polarization produced by applying multiple capacitors at different positions and with different capacitance values in intervals with the same circular polarization direction is equivalent to the effect of circular polarization produced by applying a capacitor at a fixed position.

In some implementations, during design of a multi-inductor or multi-capacitor antenna, an inductor or capacitor is first adjusted to the optimum value at a certain angle, and then the optimum values and positions of the equivalent multiple inductors or capacitors can be obtained from the above equation (4) or (6).

By observing the optimum frequencies in Table 2 and Table 3, it can be seen that, for a radiator with an original resonant frequency of 1.69 GHz, when the grounding manner via inductor is applied, the optimum frequencies corresponding to the optimum axis ratios are all greater than the original resonant frequency of 1.69 GHz; while when the grounding manner via capacitor is applied, the optimum frequencies corresponding to the optimum axis ratios are all less than the original resonant frequency of 1.69 GHz. This also proves that the aforementioned conclusion is correct, that is, the effective electrical length of the antenna can be reduced by using the grounding manner via inductor, while the effective electrical length of the antenna can be increased by using the grounding manner via capacitor.

As can be seen from the above description, circular polarization can be realized by either inductor or capacitor, and left-hand or right-hand circular polarization can be realized by applying inductors or capacitors at appropriate positions. The above description further discusses that the inductor pulling capacities of multiple inductors and the capacitor pulling capacities of multiple capacitors located in intervals with the same circular polarization direction can be superimposed. The effect of inductors or capacitors in intervals with different circular polarization directions on circular polarization will be described below.

First of all, as previously mentioned, the effect of grounding via an inductor or capacitor to produce a circularly polarized antenna is defined as the "pulling capacity" of the inductor or capacitor. On this basis, the pulling capacity of the inductor or capacitor in a right-hand circular polarization interval is defined as "right-hand pulling capacity", and the pulling capacity of the inductor or capacitor in a left-hand circular polarization interval is defined as "left-hand pulling capacity".

Based on the realization of the circular polarization, it can be concluded that when multiple inductors or capacitors are provided in different left-hand or right-hand circular polarization intervals, the circular polarization direction of the antenna is right-hand as long as the right-hand pulling capacity of the multiple inductors or capacitors is greater than the left-hand pulling capacity; on the contrary, the circular polarization direction of the antenna is left-hand as long as the left-hand pulling capacity of the multiple inductors or capacitors is greater than the right-hand pulling capacity.

To demonstrate this conclusion, in an example, an inductor is provided in the right-hand circular polarization interval of the antenna structure, and a capacitor is provided in the left-hand circular polarization interval of the antenna structure. For example, an inductor L is provided at the position of the first included angle $\alpha$=60°, and a capacitor C is provided at the position of the second included angle $\beta$=−15° (i.e., $\beta$=345°) with a capacitance value of 0.13 pF. As mentioned above, the capacitor C with the capacitance value of 0.13 pF is equivalent to a TVS, and the TVS can also provide electrostatic protection for the antenna structure, which will not be repeated herein.

Figure 8:
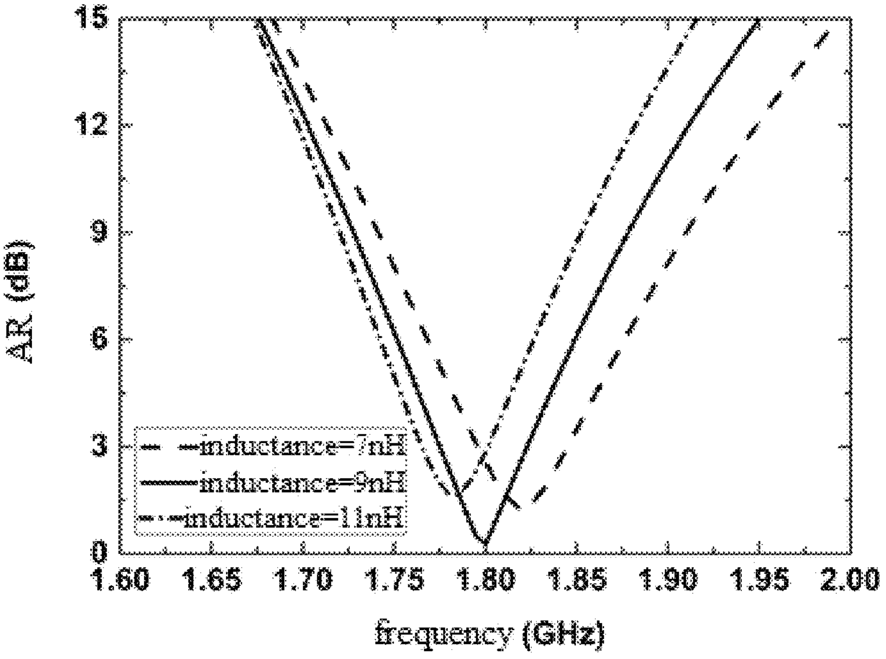
FIG. 8 is a graph illustrating changes in an axial ratio of an antenna with an inductance according to an implementation of the present disclosure.

First, FIG. 8 illustrates a graph of changes in the axis ratio and frequency of the antenna with the inductance value when the inductor L is fixed at the position of the first included angle $\alpha$=60° and the capacitor C with the capacitance value of 0.13 pF is provided at the position of the second included angle $\beta$=−15°. It can be seen from FIG. 8 that, the axis ratio of circular polarization reaches the optimum when the inductance value is 9 nH, and the optimum frequency corresponding to the optimum axis ratio is 1.8 GHz. However, compared with the above Table 3, the optimum frequency is 1.785 GHz at the same angle $\alpha$=60° when applying the grounding manner via inductor alone. This proves that the pulling capacity of the capacitor has some influence on the pulling capacity of the inductor after the inductor and capacitor are applied simultaneously. During design of the antenna, the resonant frequency of the antenna can be adjusted accordingly to increase the adaptability and flexibility of the design of the antenna.

Figure 9:
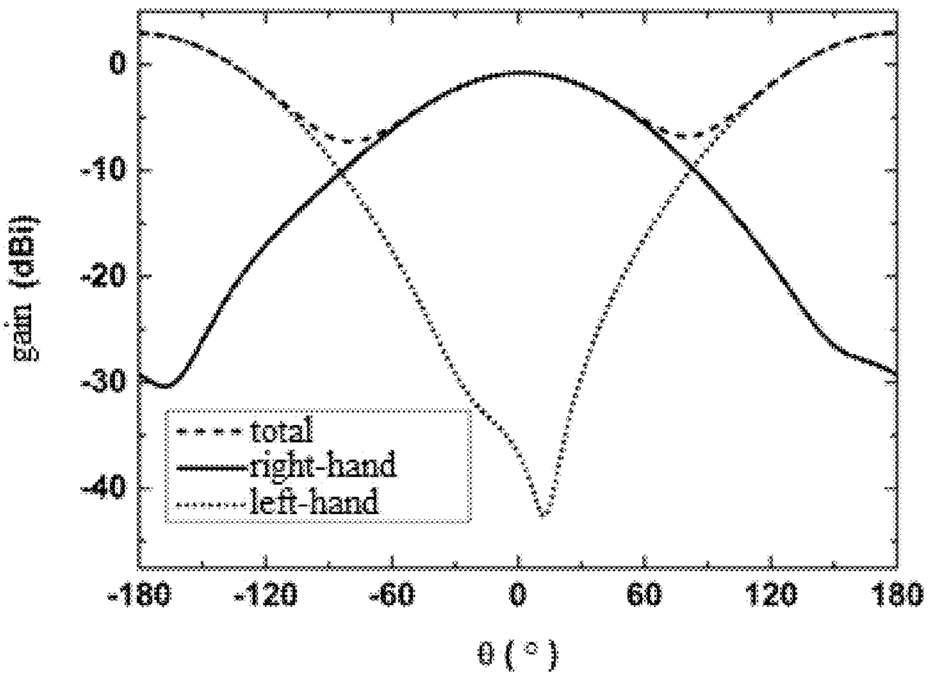
FIG. 9 is a graph illustrating a radiation gain of an antenna structure according to an implementation of the present disclosure.

FIG. 9 is a graph illustrating a radiation gain of the antenna structure in this example. As can be seen from FIG. 9, the antenna structure is still right-hand circularly polarized. This is because the right-hand pulling capacity produced by the inductor is greater than the left-hand pulling capacity produced by the capacitor, so the antenna is still right-hand circularly polarized after the superposition of the two, which also proves the correctness of the above conclusion.

From the above discussion, it can be understood that, in some other examples of the design of the circularly polarized antenna according to the present disclosure, multiple capacitors and multiple inductors can be provided at different positions of the antenna simultaneously. When the capacitors and inductors are located in circular polarization intervals with the same direction, the circular polarization effect is superimposed and enhanced; and when the capacitors and inductors are located in circular polarization intervals with different directions, the circular polarization direction depends on the side with the stronger pulling capacity. For example, if the right-hand pulling capacity in producing right-hand circular polarization is greater than the left-hand pulling capacity in producing left-hand circular polarization, then the antenna structure maintains right-hand circular polarization.

With the above description, more flexible and applicable design schemes of the antenna structure can be realized. For example, by using combined grounding via inductors and/or capacitors with different pulling capacities, the optimum resonant frequency can be adjusted while maintaining the circular polarization direction of the antenna; for another example, by combined grounding via capacitors and inductors in a distributed fashion, more design forms of the antenna can be provided; for still another example, a TVS can be applied to the antenna, thus providing electrostatic protection for the antenna structure; and so on.

As can be seen from the above, with the circularly polarized antenna according to the implementations of the present disclosure, the line connected between the feeding terminal and the center point of the radiator is the first connecting line, the line connected between the first grounding terminal and the center point of the radiator is the second connecting line, and the included angle from the first connecting line to the second connecting line along the clockwise direction is the first included angle. By adjusting the first included angle, that is, changing the position of the inductor, circularly polarized antennas with different directions can be realized. If the first included angle is in a range from 0° to 90° or in a range from 180° to 270°, the current in the radiator rotates counterclockwise to form the right-hand circularly polarized antenna; and if the first included angle is in a range from 90° to 180° or in a range from 270° to 360°, the current in the radiator rotates clockwise to form the left-hand circularly polarized antenna. With the antenna in the present disclosure, circularly polarized waves with different directions can be realized by adjusting the first included angle, which can meet design requirements for the circularly polarized antennas with different directions. Moreover, a circularly polarized antenna realized by an inductor can be equivalent to an antenna structure realized by multiple inductors at different positions and with different inductance values, thus enabling the design of circularly polarized antennas with more structures using multiple first grounding terminals.

The circularly polarized antenna according to the implementations of the present disclosure further includes at least one second grounding terminal, one end of the second grounding terminal being electrically connected to the radiator, and the other end of the second grounding terminal being electrically connected to the grounding module of the mainboard via the capacitor. The current in the radiator is pulled by the capacitor, such that the effective circulating current being rotated is produced in the annular radiator, thereby forming the circularly polarized wave and realizing the circularly polarized antenna. Moreover, the pulling capacities of the capacitor and inductor on the current can be superimposed, such that the design of the circularly polarized antenna can be realized by using the capacitor and inductor simultaneously, which provides more possibilities for the design of the circularly polarized antenna.

With the circularly polarized antenna according to the implementations of the present disclosure, the line connected between the feeding terminal and the center point of the radiator is the first connecting line, the line connected between the second grounding terminal and the center point of the radiator is the third connecting line, and the included angle from the first connecting line to the third connecting line along the counterclockwise direction is the second included angle. By adjusting the second included angle, that is, changing the position of the capacitor, circularly polarized antennas with different directions can be realized. The second included angle is formed along the direction opposite to the first included angle, that is, the effect produced by the capacitor is opposite to that produced by the inductor. If the second included angle is in a range from 0° to 90° or in a range from 180° to 270°, the current in the radiator rotates counterclockwise to form the right-hand circularly polarized antenna; and if the second included angle is in a range from 90° to 180° or in a range from 270° to 360°, the current in the radiator rotates clockwise to form the left-hand circularly polarized antenna. Moreover, a circularly polarized antenna realized by a capacitor can be equivalent to an antenna structure realized by multiple capacitors at different positions and with different capacitance values, thus enabling the design of circularly polarized antennas with more structures using multiple second grounding terminals.

The circularly polarized antenna according to the implementations of the present disclosure may further include a transient voltage suppressor (TVS). TVS can provide electrostatic protection for the antenna, and a parasitic capacitance of TVS itself is equivalent to a capacitor with a capacitance value of 0.13 pF at the antenna frequencies discussed in the present disclosure. Using TVS as the capacitor at the second grounding terminal can not only realize the design of the circularly polarized antenna, but also provide electrostatic protection for the antenna.

The implementation and structure of the circularly polarized antenna according to the present disclosure have been described above. The above-described circularly polarized antenna can implement any type of antenna suitable for implementation, such as a satellite positioning antenna, a Bluetooth antenna, a Wifi antenna, and a 4G/5G antenna, which is not limited in the present disclosure. Hereinafter, by using the above-described antenna structure to implement a GPS antenna for satellite positioning in a smart watch as an example, the wearable device and the GPS antenna according to the implementations of the present disclosure will be described in detail.

Figure 10:
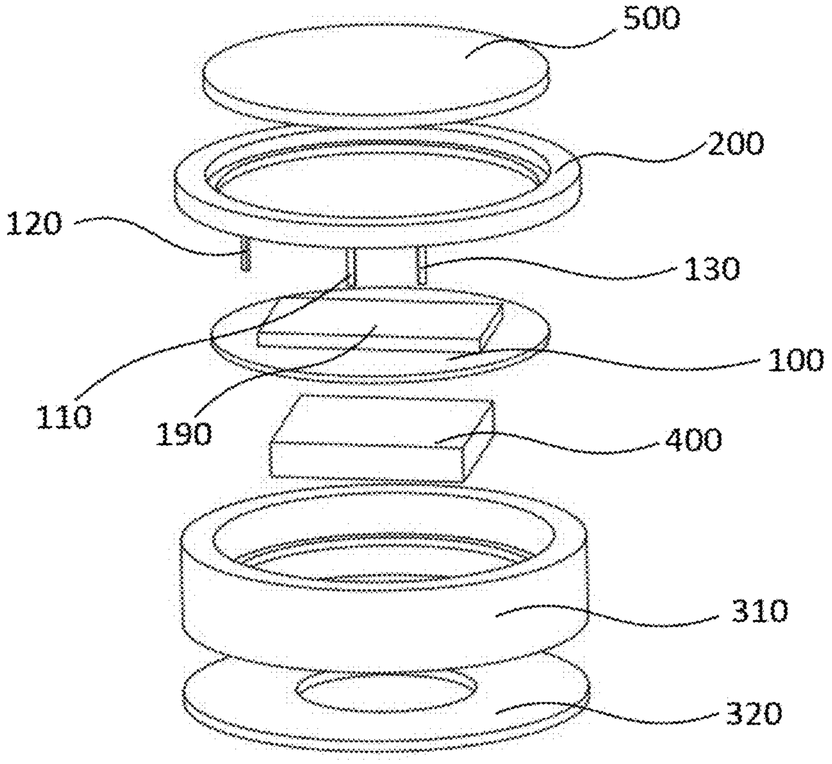
FIG. 10 is an exploded view of a structure of a wearable device according to an implementation of the present disclosure.

As shown in FIG. 10, in this implementation, the smart watch includes a housing. The housing includes a middle frame 310 and a bottom case 320, and the middle frame 310 and the bottom case 320 are made of non-metallic materials, such as plastic, ceramic, or silicone. In this implementation, the watch has a circular main body, and thus the housing forms a cylindrical structure. It can be understood that the housing can also be in any other shape suitable for implementation, which is not limited in the present disclosure. It should be noted here that, though the bottom case 320 is made of a non-metallic material in this implementation, in fact, if the bottom case 320 is made of a metallic material, the right-hand circularly polarized GPS antenna required by the present disclosure can also be realized, which is not limited in the present disclosure.

The mainboard 100 and a battery 400 are provided inside the housing, and the battery 400 may be a lithium battery so as to power the mainboard 100. The mainboard 100 is the main PCB of the device with processors and various circuit modules integrated thereon, which will not be described in detail in the present disclosure.

In some implementations, a shield 190 is provided on the mainboard 100 to electromagnetically shield the processors and other circuit modules on the mainboard 100, thereby avoiding an influence on the antenna performance and improving the stability of the antenna performance.

An annular metal bezel 200 is disposed on an end surface of the middle frame 310 away from the bottom case 320, that is, the metal bezel 200 is fixedly disposed around a front edge of the watch. The metal bezel 200 can be used not only as a metal decoration to improve the texture and aesthetic appearance of the watch, but also for assembling a screen assembly 500, that is, the screen assembly 500 is fixedly assembled to the metal bezel 200. More importantly, in this implementation, the metal bezel 200 is placed above the mainboard 100 as the radiator of the GPS antenna in the present disclosure, i.e., the radiator 200 in FIG. 1.

In this implementation, one end of the feeding terminal 110 is formed on the metal bezel 200, and the other end of the feeding terminal 110 is connected to the feeding module of the mainboard 100. Meanwhile, the first grounding terminal 120 and the second grounding terminal 130 are formed on the metal bezel 200. The first grounding terminal 120 is connected to the ground of the mainboard 100 via an inductor, and the second grounding terminal 130 is connected to the ground of the mainboard 100 via a capacitor. For the implementation of the first grounding terminal 120 and the second grounding terminal 130 have been described above, which will not be repeated herein.

Figure 11:
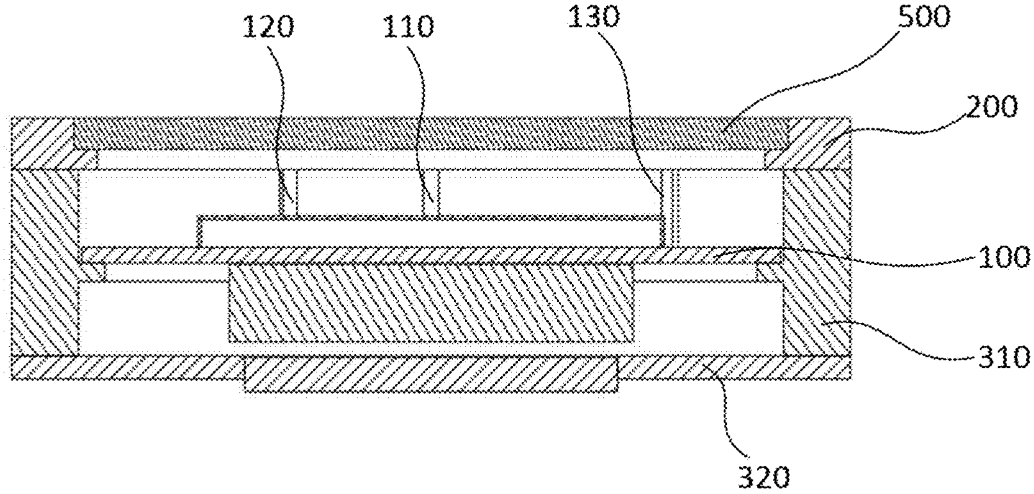
FIG. 11 is a cross-sectional view illustrating an assembled structure of a wearable device according to an implementation of the present disclosure.

The structure of the smart watch in this implementation in an assembled state is shown in FIG. 11. This implementation is described by focusing on the structure of the GPS antenna, and the structure of the smart watch in this implementation is simplified, and the simplified structure of the GPS antenna is shown in FIG. 12.

Figure 12:
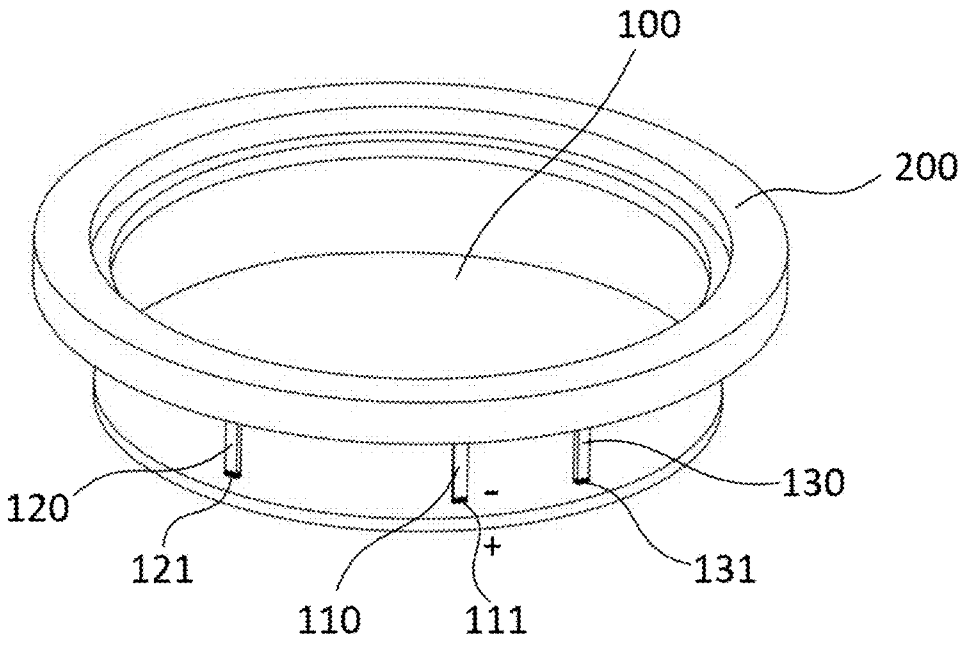
FIG. 12 is a schematic structural diagram of a GPS antenna according to an implementation of the present disclosure.

As shown in FIG. 12, during the design of the GPS antenna in this implementation, the original resonant frequency of the antenna is about 1.46 GHz without being grounded via the first grounding terminal 120 and the second grounding terminal 130, which is less than the operating frequency of the GPS antenna that is 1.575 GHz. Based on the aforementioned descriptions, the resonant frequency of the antenna needs to be increased by using an inductor as the dominant pulling capacity.

In this implementation, the capacitor at the second grounding terminal 130 is a capacitor with a capacitance value of 0.13 pF, which, as described above, is equivalent to a TVS, and the TVS can also provide electrostatic protection for the antenna. However, in this implementation, a TVS can also be used as the capacitor at the second grounding terminal 130, and is substantially the same as the capacitor with the capacitance value of 0.13 pF. The second grounding terminal 130 is disposed at the position of the second included angle $\beta$=15°.

After the capacitance value and position of the capacitor are determined, the position and inductance value of the inductor are determined according to the goal of realizing a right-hand circularly polarized GPS antenna with the optimum frequency of 1.575 GHz. The appropriate inductance value and position are obtained according to the dependence of the optimum frequency with the inductance value and the first included angle in Table 3. In this implementation, in an optimized design, it is obtained that, when an inductor with an inductance value of 11 nH is applied at the position of the first included angle $\alpha$=65°, the desired right-hand circular polarization performance of the GPS antenna can be realized. That is, in this implementation, when the inductance parameter is $\alpha$=65° and the inductance value is 11 nH, and the capacitance parameter is $\beta$=15° and the capacitance value is 0.13 pF, the right-hand circularly polarized GPS antenna of the smart watch has the optimum performance.

Figure 13:
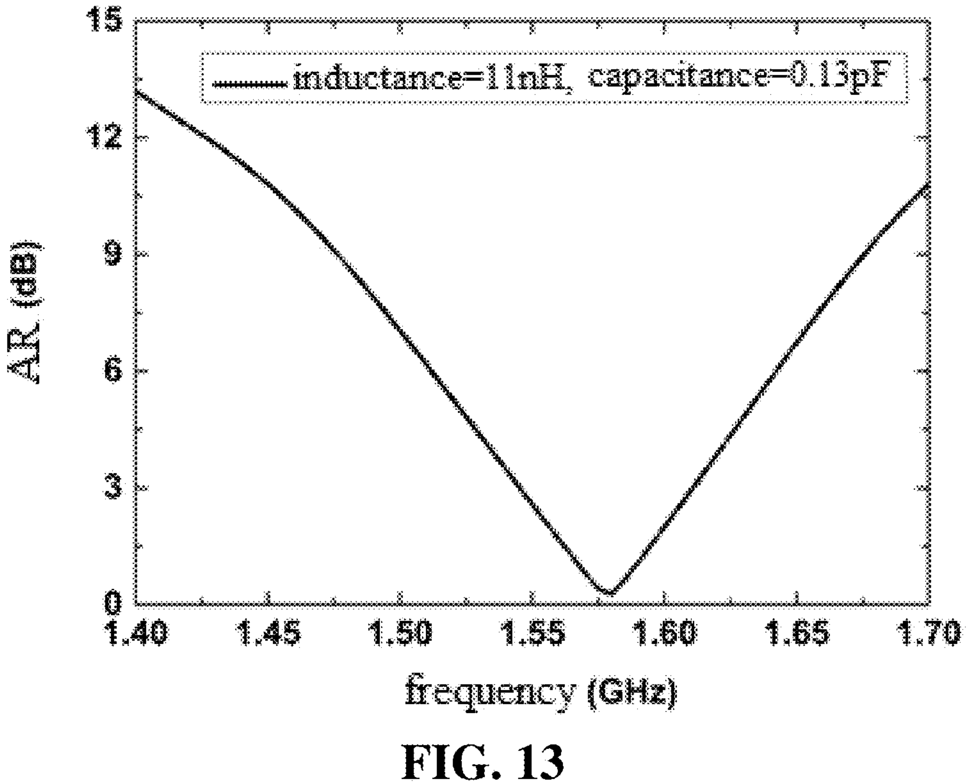
FIG. 13 is a graph illustrating changes in an axial ratio of an antenna with a frequency according to an implementation of the present disclosure.
Figure 14:
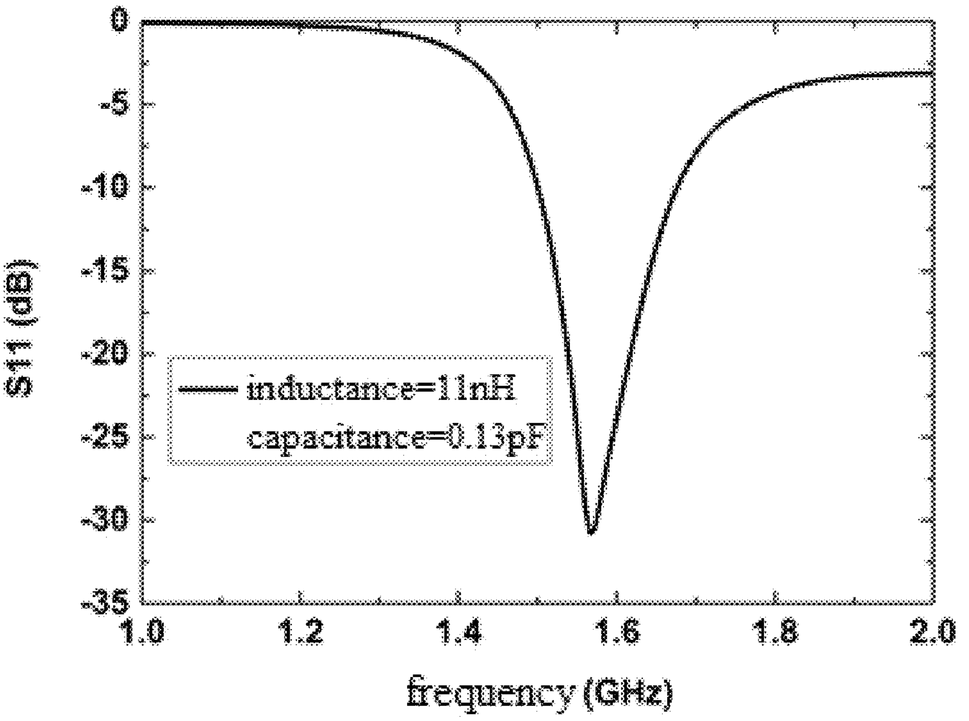
FIG. 14 is a graph illustrating changes in a return loss of an antenna with a frequency according to an implementation of the present disclosure.
Figure 15:
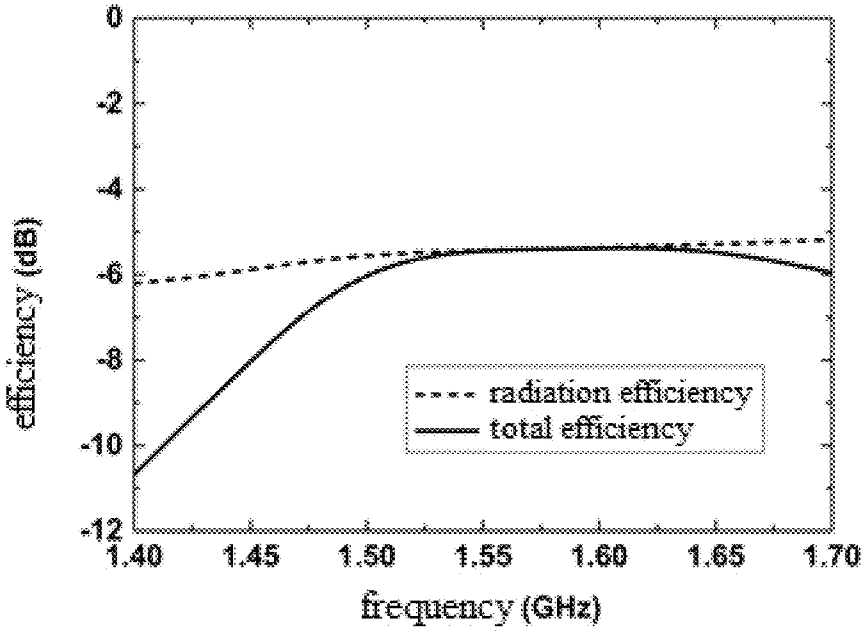
FIG. 15 is a graph illustrating changes in an antenna efficiency of an antenna with a frequency according to an implementation of the present disclosure.

FIG. 13 illustrates a graph of changes in an axial ratio of the GPS antenna with a frequency according to this implementation. FIG. 14 illustrates a graph of changes in a return loss of the GPS antenna with a frequency according to this implementation. FIG. 15 illustrates a graph of changes in an antenna efficiency of the GPS antenna with a frequency according to this implementation. It can be seen from FIG. 13 to FIG. 15 that the antenna has good axial ratio, antenna return loss and antenna efficiency in the frequency band involving GPS, BeiDou and Glonass (1560~1610 MHz with a bandwidth of 50 MHz), which also proves that the circularly polarized GPS antenna in this implementation has a good antenna performance and can meet the requirements for use of the smart watch.

Figure 16:
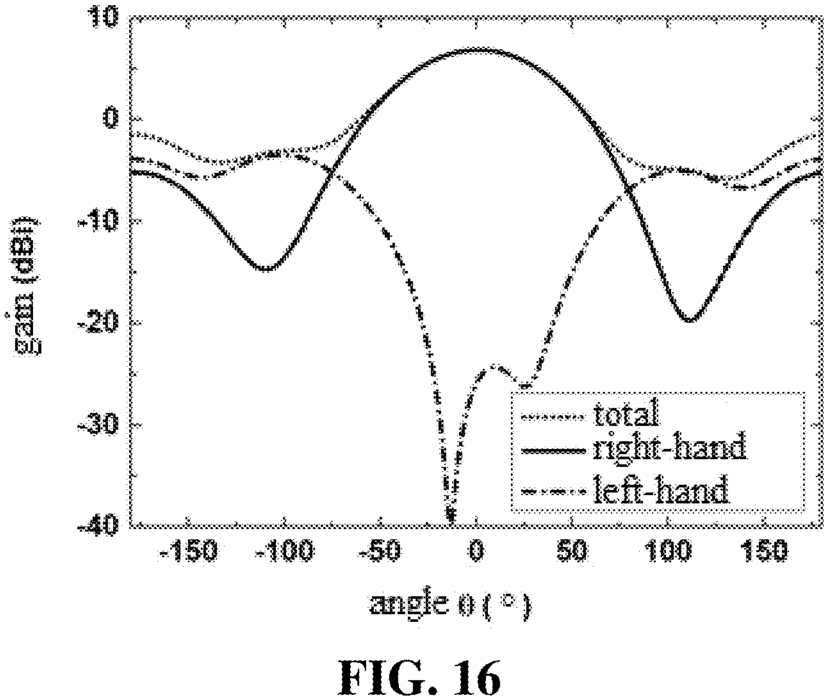
FIG. 16 is a graph illustrating a gain of an antenna in an XOZ plane according to an implementation of the present disclosure.
Figure 17:
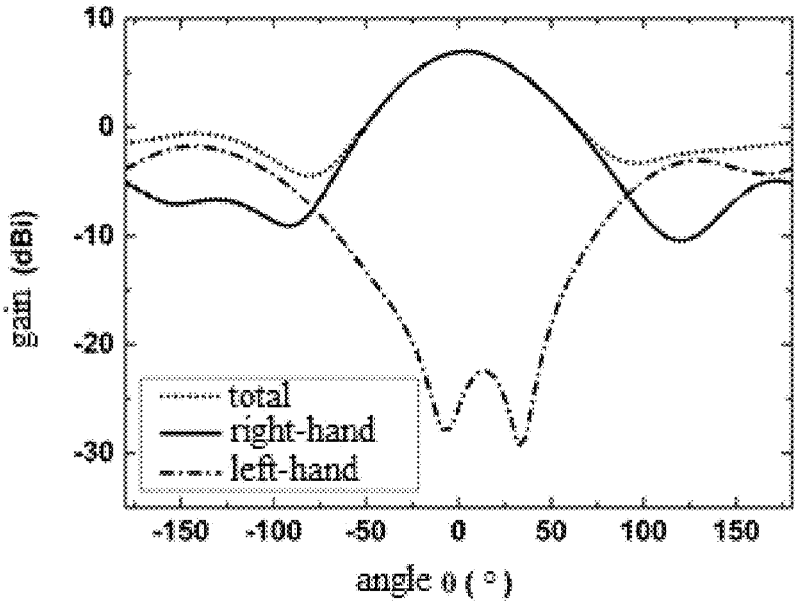
FIG. 17 is a graph illustrating a gain of an antenna in a YOZ plane according to an implementation of the present disclosure.

To further illustrate that the smart watch with the GPS antenna according to this implementation has good wearability, FIG. 16 illustrates a graph of changes in a total gain, right-hand circular polarization gain, and left-hand circular polarization gain of the antenna according to this implementation with an angle θ in the XOZ plane at the frequency of 1.575 GHz. FIG. 17 illustrates a graph of changes in a total gain, right-hand circular polarization gain, and left-hand circular polarization gain of the antenna according to this implementation with an angle θ in the YOZ plane at the frequency of 1.575 GHz. The XOZ plane and the YOZ plane mentioned herein represent planes of a space coordinate system of the watch during wearing in FIG. 18 and FIG. 19, respectively. It can be seen from FIG. 16 and FIG. 17 that the gain of the right-hand circularly polarized wave and the total gain of the antenna are both in good consistency when the angle θ is within the range of ±60°, and the left-hand circularly polarized wave is well suppressed, which also proves that the circularly polarized wave in this implementation has a good right-hand circular polarization performance.

Figure 18:
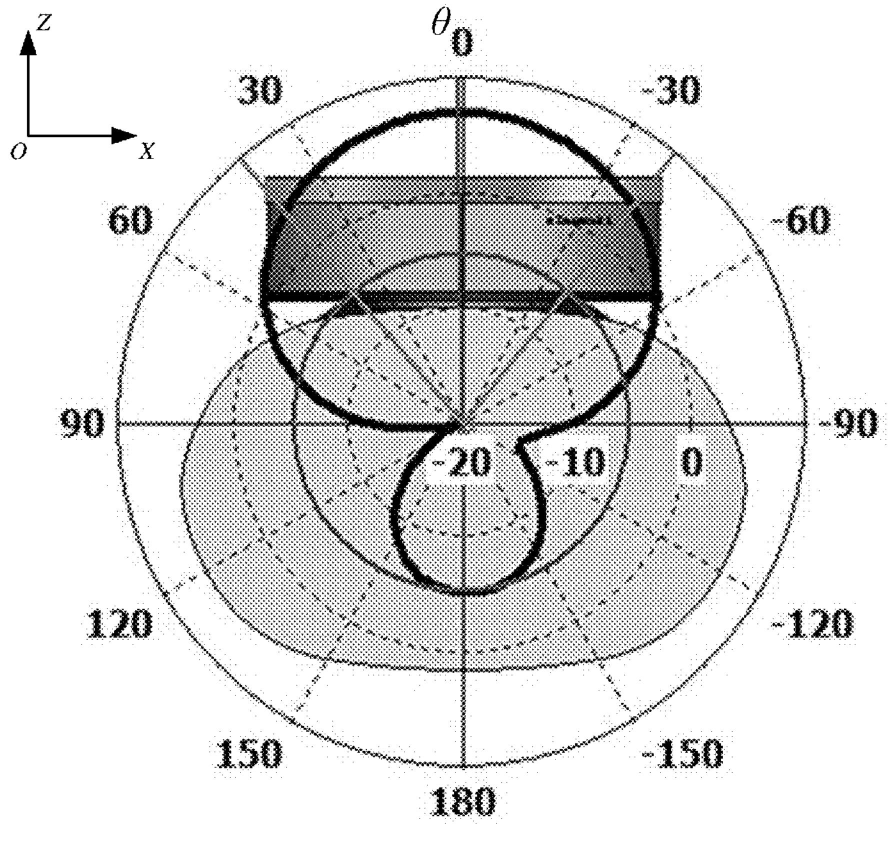
FIG. 18 is a radiation pattern of an antenna in an XOZ plane according to an implementation of the present disclosure.
Figure 19:
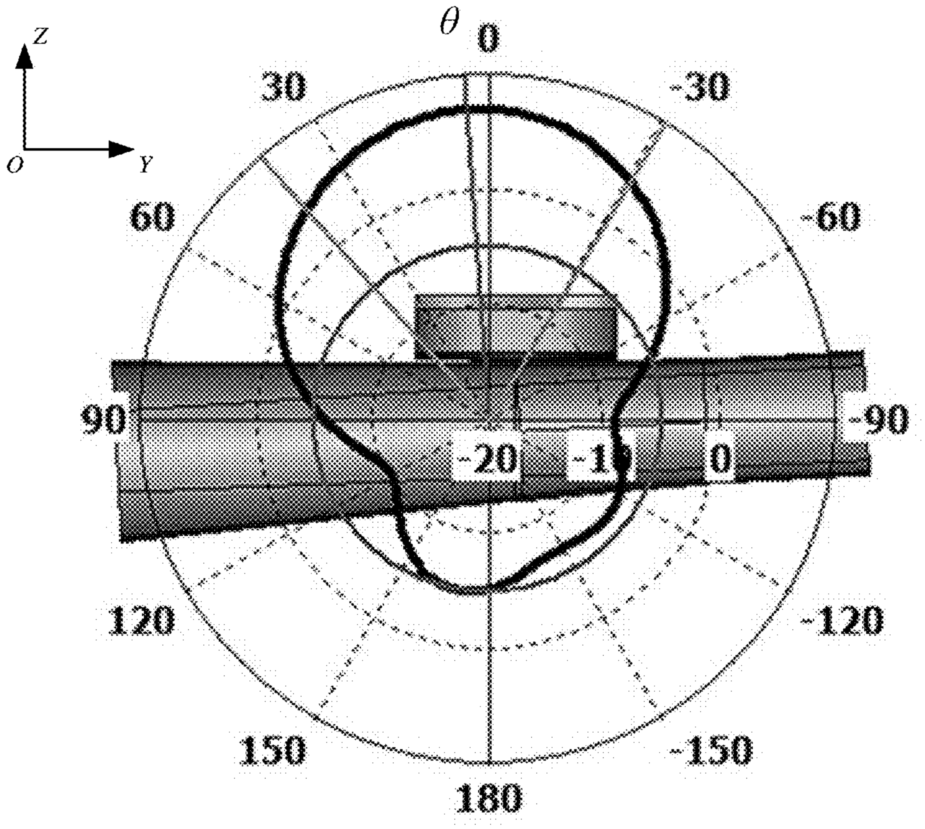
FIG. 19 is a radiation pattern of an antenna in a YOZ plane according to an implementation of the present disclosure.

FIG. 18 and FIG. 19 illustrate radiation patterns of the right-hand circularly polarized wave of the antenna according to this implementation in the XOZ and YOZ planes at the frequency of 1.575 GHz. It can be seen from FIG. 18 and FIG. 19 that the maximum gain of the GPS antenna in this implementation appears at a position above an arm or wrist, and can just meet the three main application scenarios that need to be concerned when the watch is worn on the arm, which include: when the wrist is raised to observe the watch, the direction of the watch pointing to the sky; and in the case of running and walking, the 6 o'clock direction pointing to the sky and the 9 o'clock direction pointing to the sky when the arm is swinging. In addition, it can also be seen from FIG. 18 and FIG. 19 that the radiation of the antenna has better symmetry on left and right sides in the XOZ plane, which also shows that the GPS antenna in this implementation has better consistency for being worn on the left hand and right hand, in other words, it can satisfy the needs of users who wear watches on the left hands and users who wear watches on the right hands. The above results show that the right-hand circularly polarized GPS antenna in this implementation has a good antenna performance and can meet the requirements for fast satellite search and accurate navigation.

In the implementation shown in FIG. 10, the original resonant frequency of the antenna structure without inductors and capacitors being applied is 1.46 GHz, which is less than the operating frequency of the GPS antenna that is 1.575 GHz, thus the right-hand circularly polarized GPS antenna is realized by using the inductor as the dominant pulling capacity. If only the radius of the metal bezel 200 is reduced by 2.5 mm (components such as the screen and the mainboard should be reduced correspondingly at the same time), the original resonant frequency of the metal bezel of the watch becomes about 1.69 GHz, which is greater than the operating frequency of the GPS antenna that is 1.575 GHz, under the condition that other circumstances (such as the material of the plastic housing) in the implementation of FIG. 10 remain unchanged. In this case, according to the above descriptions, it is necessary to adopt a grounding manner with a capacitor as the dominant pulling capacity to realize the right-hand circularly polarized GPS antenna.

Figure 20:
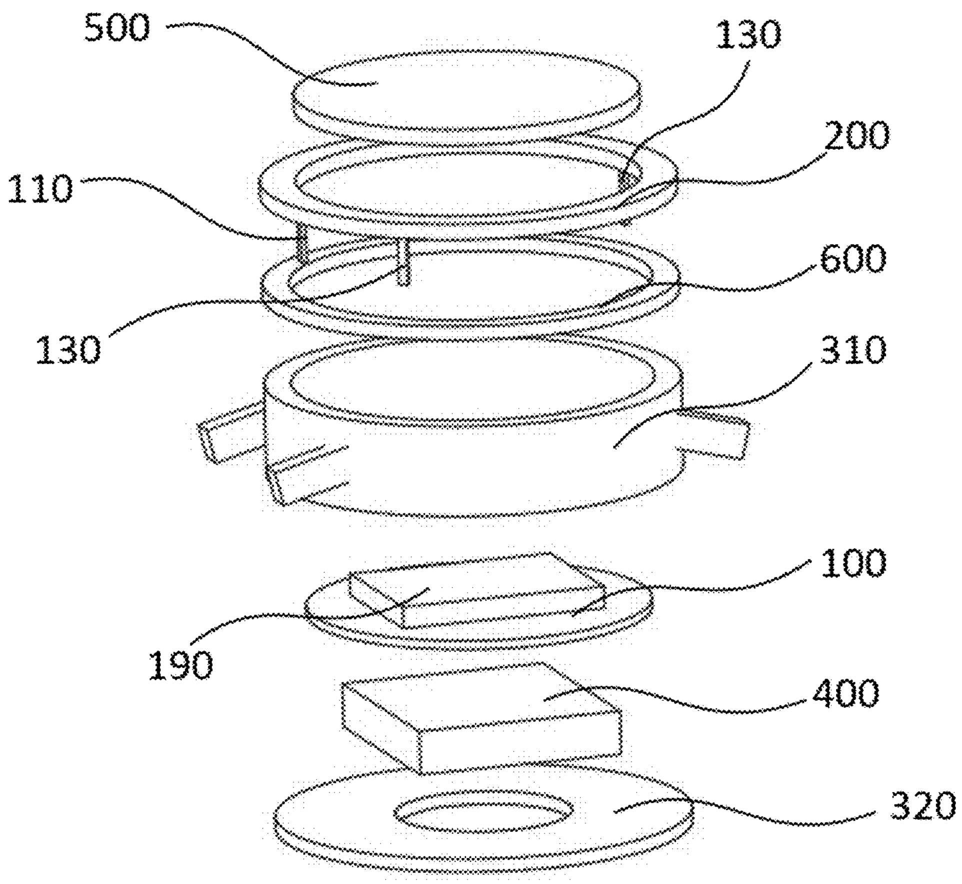
FIG. 20 is an exploded view of a structure of a wearable device according to another implementation of the present disclosure.

For further illustration, an implementation of the right-hand circularly polarized GPS antenna realized by using the grounding manner via capacitor is illustrated in FIG. 20.

As shown in FIG. 20, in this implementation, the smart watch includes a housing. The housing includes a middle frame 310 and a bottom case 320. Especially in this implementation, the middle frame 310 and the bottom case 320 are both made of metallic materials, and the metal middle frame and the metal bottom case have a better texture, which improves the aesthetic appearance of the device and improves the product competitiveness. However, if the bottom case 320 is made of a non-metallic material (such as plastic, ceramic, or silicone), the right-hand circularly polarized GPS antenna can still be realized according to the scheme proposed in the present disclosure.

The mainboard 100 and a battery 400 are provided inside the housing, and the battery 400 may be a lithium battery so as to power the mainboard 100. The mainboard 100 is the main PCB of the device with processors and various circuit modules integrated thereon, and a shield 190 is configured to electromagnetically shield the processors and various circuit modules on the mainboard 100, which will not be described in detail in the present disclosure. The grounding module of the mainboard 100 is connected to the metal middle frame 310. For example, the grounding module of the mainboard 100 is connected to the middle frame 310 via four connecting terminals. Since the middle frame 310 is connected to the grounding module of the mainboard 100, the middle frame 310 is equivalent to the ground of the mainboard 100.

A metal bezel 200 is fixedly disposed on an end surface of the middle frame 310 away from the bottom case 320, that is, the metal bezel 200 is fixedly disposed around a front edge of the watch. The metal bezel 200 can be used not only as a metal decoration to improve the texture and aesthetic appearance of the watch, but also for assembling a screen assembly 500, that is, the screen assembly 500 is fixedly assembled to the metal bezel 200. More importantly, in this implementation, the metal bezel 200 serves as the radiator of the GPS antenna in the present disclosure, i.e., the radiator 200 in FIG. 1.

It should be noted that, in this implementation, an insulating layer 600 is provided in a ring between the metal bezel 200 and the middle frame 310, and aims to insulate and isolate the metal bezel 200 from the ground of the mainboard 100 to form a gap structure, such that the antenna function can be realized by feeding power to the formed gap structure. In other words, in the implementation shown in FIG. 10, the gap structure of the antenna is formed by the gap between the mainboard 100 and the metal bezel 200, while in the present implementation, the gap structure of the antenna is formed by the gap between the metal middle frame 310 and the metal bezel 200 (i.e., the insulating layer 600). Different antenna structures also prove that the disclosed inventive concept can be applied to various forms of antenna structures, all of which can meet the design requirements of circular polarization, thus providing more forms for the antenna design of the watch.

Figure 21:
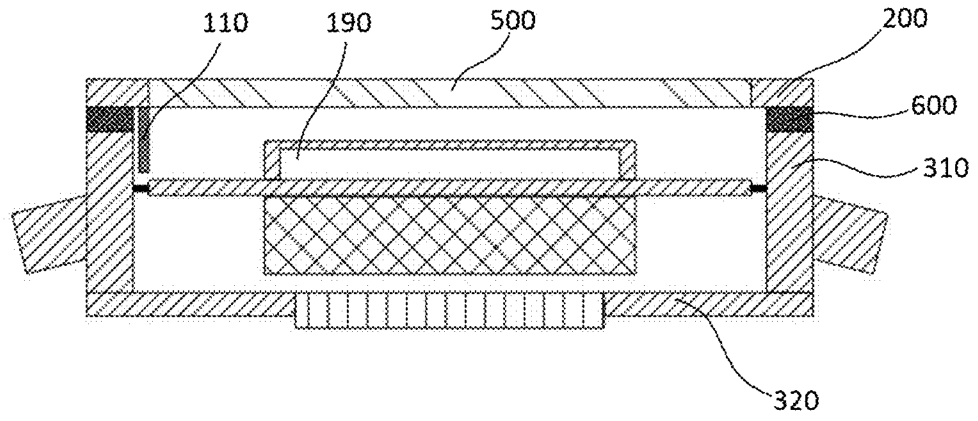
FIG. 21 is a cross-sectional view illustrating an assembled structure of a wearable device according to another implementation of the present disclosure.

In this implementation, the structure of the smart watch in an assembled state is shown in FIG. 21. The feeding terminal 110 is connected across the gap formed between the metal bezel 200 and the metal middle frame 310, and the feeding terminal 110 is connected to the feeding module of the mainboard 100. Also, the GPS antenna structure in this implementation further includes two second grounding terminals 130, that is, grounded via two capacitors.

In this implementation, the original resonant frequency of the metal bezel 200 without two capacitors being applied is about 1.69 GHz, which is greater than the operating frequency of the GPS antenna that is 1.575 GHz, thus the resonant frequency of the antenna is reduced by using the grounding manner via capacitor.

First, in order to provide electrostatic protection for the antenna structure, one of the capacitors with a capacitance value of 0.13 pF is provided at the position of the second included angle $\beta$=190°, and is equivalent to a TVS which can also provide electrostatic protection for the antenna. However, in this implementation, a TVS can also be used as the capacitor at one of the second grounding terminals 130, and is substantially the same as the capacitor with the capacitance value of 0.13 pF.

After the capacitance value and position of one of the capacitors are determined, the position and capacitance value of the other capacitor are determined according to the goal of realizing a right-hand circularly polarized GPS antenna with the optimum frequency of 1.575 GHz. In this implementation, in an optimized design, it is obtained that, the other capacitor has a capacitance value of 0.2 pF and is provided at the position of the second included angle $\beta$=50°. It can be known from the foregoing that, both capacitors are located in a right-hand circular polarization interval, and thus the resulting antenna is also right-hand circularly polarized.

Figure 22:
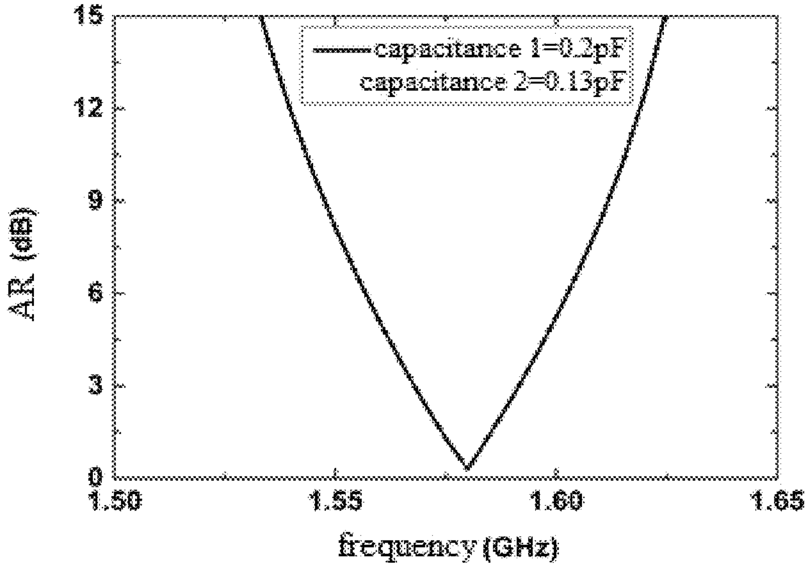
FIG. 22 is a graph illustrating changes in an axial ratio of an antenna with a frequency according to another implementation of the present disclosure.
Figure 23:
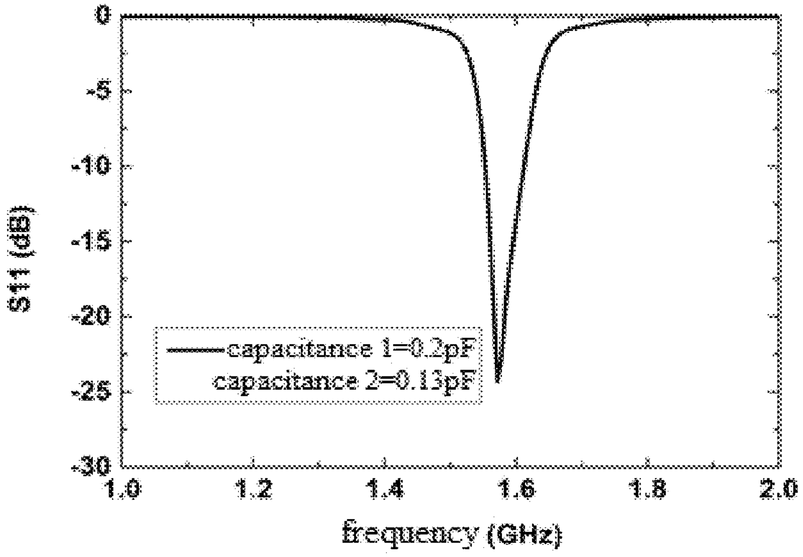
FIG. 23 is a graph illustrating changes in a return loss of an antenna with a frequency according to another implementation of the present disclosure.
Figure 24:
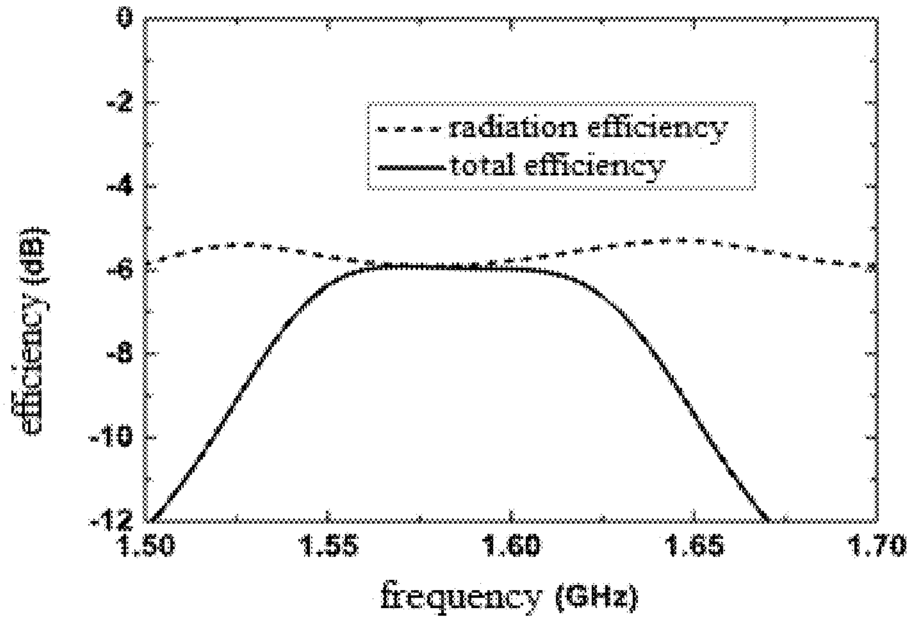
FIG. 24 is a graph illustrating changes in an antenna efficiency of an antenna with a frequency according to another implementation of the present disclosure.

FIG. 22 illustrates a graph of changes in an axial ratio of the GPS antenna with a frequency according to this implementation. FIG. 23 illustrates a graph of changes in a return loss of the GPS antenna with a frequency according to this implementation. FIG. 24 illustrates a graph of changes in an antenna efficiency of the GPS antenna with a frequency according to this implementation. As can be seen from FIG. 22 to FIG. 24, the GPS antenna according to this implementation has good axial ratio, antenna return loss and antenna efficiency.

Figure 25:
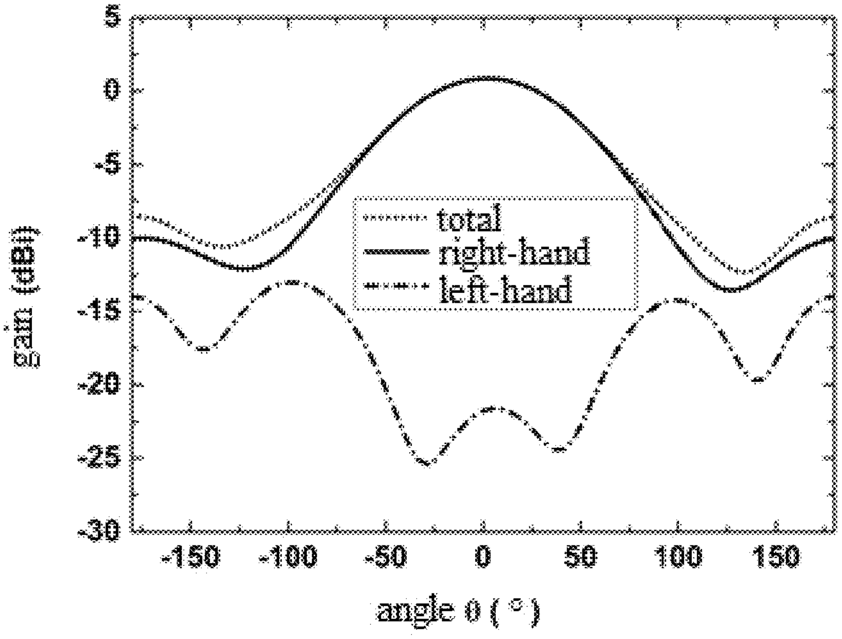
FIG. 25 is a graph illustrating a gain of an antenna in an XOZ plane according to another implementation of the present disclosure.
Figure 26:
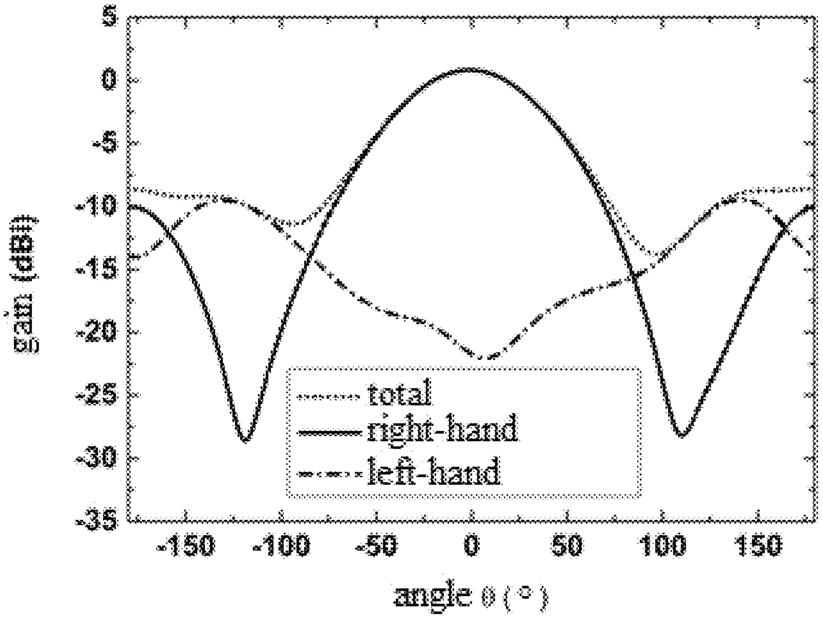
FIG. 26 is a graph illustrating a gain of an antenna in a YOZ plane according to another implementation of the present disclosure.

To further illustrate that the smart watch with the GPS antenna according to this implementation has good wearability, FIG. 25 illustrates a graph of changes in a total gain, right-hand circular polarization gain, and left-hand circular polarization gain of the antenna according to this implementation with an angle $\theta$ in the XOZ plane at the frequency of 1.575 GHz. FIG. 26 illustrates a graph of changes in a total gain, right-hand circular polarization gain, and left-hand circular polarization gain of the antenna according to this implementation with an angle $\theta$ n the YOZ plane at the frequency of 1.575 GHz. The XOZ plane and the YOZ plane mentioned herein represent planes of a space coordinate system of the watch during wearing in FIG. 27 and FIG. 28, respectively. It can be seen from FIG. 25 and FIG. 26 that the gain of the right-hand circularly polarized wave and the total gain of the antenna are both in good consistency when the angle $\theta$ is within the range of ±60°, and the left-hand circularly polarized wave is well suppressed, which also proves that the circularly polarized wave in this implementation has a good right-hand circular polarization performance.

Figure 27:
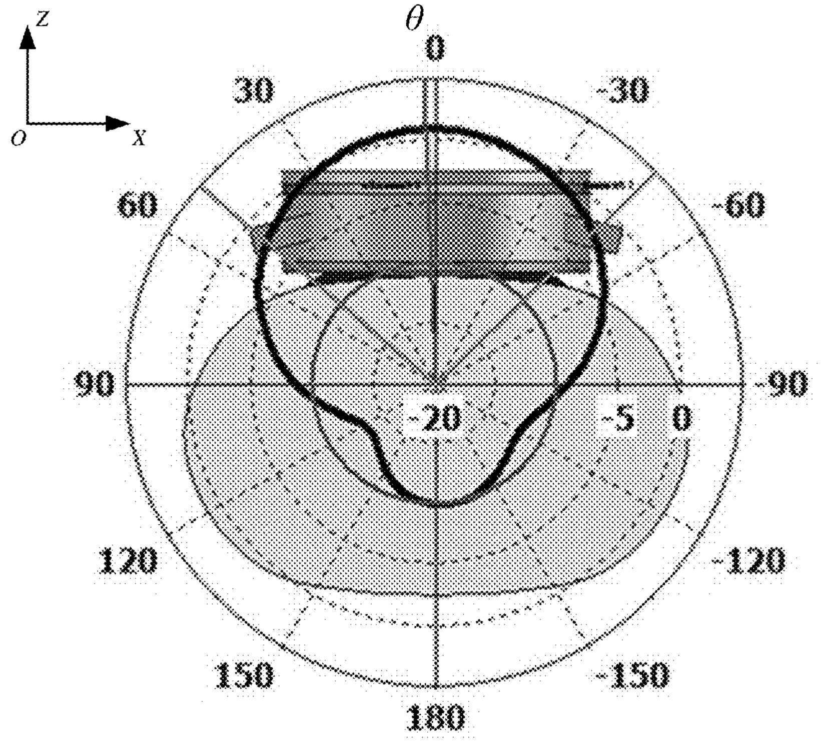
FIG. 27 is a radiation pattern of an antenna in an XOZ plane according to another implementation of the present disclosure.
Figure 28:
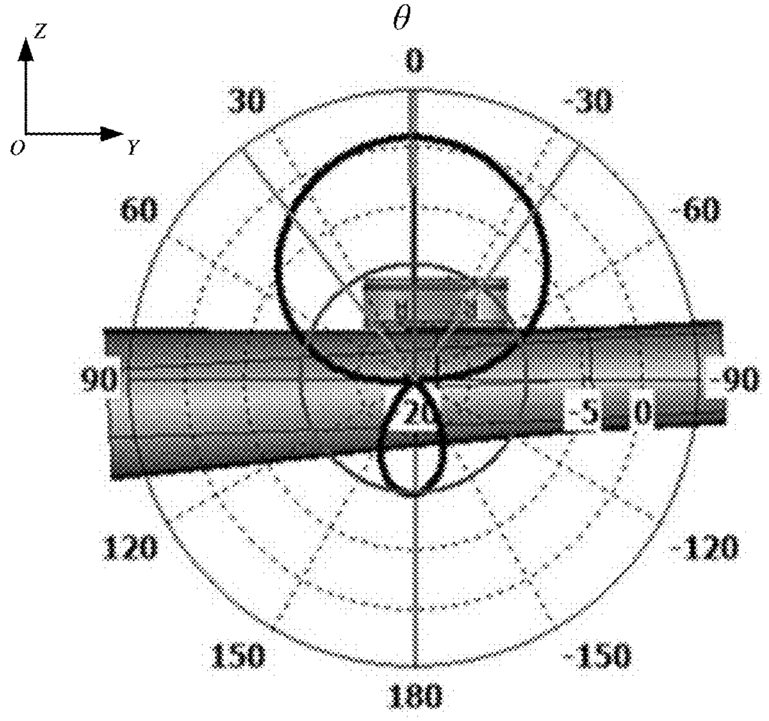
FIG. 28 is a radiation pattern of an antenna in a YOZ plane according to another implementation of the present disclosure.

FIG. 27 and FIG. 28 illustrate radiation patterns of the right-hand circularly polarized wave of the antenna according to this implementation in the XOZ and YOZ planes at the frequency of 1.575 GHz. It can be seen from FIG. 27 and FIG. 28 that the maximum gain of the GPS antenna in this implementation appears at a position above an arm or wrist, and can just meet the three main application scenarios that need to be concerned when the watch is worn on the arm, which include: when the wrist is raised to observe the watch, the direction of the watch pointing to the sky; and in the case of running and walking, the 6 o'clock direction pointing to the sky and the 9 o'clock direction pointing to the sky when the arm is swinging. In addition, it can also be seen from FIG. 27 and FIG. 28 that the radiation of the antenna has better symmetry on left and right sides in the XOZ plane, which also shows that the GPS antenna in this implementation has better consistency for being worn on the left hand and right hand, in other words, it can satisfy the needs of users who wear watches on the left hands and users who wear watches on the right hands. The above results show that the right-hand circularly polarized GPS antenna in this implementation has a good antenna performance and can meet the requirements for fast satellite search and accurate navigation.

From the description of the GPS right-hand circularly polarized antenna of the smart watch in the above two specific implementations, it can be understood that the antenna structure in the present disclosure directly feeds the annular radiator, pulls the current in the radiator with inductors and/or capacitors, such that an effective circulating current being rotated is produced in the annular radiator, thereby forming a circularly polarized wave and realizing a circularly polarized antenna. Compared with a linearly polarized antenna, the circularly polarized antenna has higher reception efficiency, resulting in more accurate positioning during satellite positioning. Compared with circularly polarized antennas according to the implementation schemes in the related art, the circularly polarized antenna in the present disclosure does not need to couple other structures, which greatly simplifies the structure and difficulty of the circularly polarized antenna, and makes it easier to be implemented in a wearable device with a smaller volume. Moreover, through the above description of the position and number of the capacitor and inductor, as well as the discussion of the influence of the inductor and capacitor on the effective electrical length of the antenna, more design forms of antenna structures can be provided to meet the applicability of the antenna structures in various devices.

Two different antenna structures have been shown in the two implementations of FIG. 10 and FIG. 20, respectively. As previously mentioned, in the implementation shown in FIG. 10, the gap structure of the antenna is formed by the gap between the mainboard 100 and the metal bezel 200, while in the implementation shown in FIG. 20, the gap structure of the antenna is formed by the gap between the metal middle frame 310 and the metal bezel 200. In fact, the form of the antenna for implementing this scheme is not limited thereto. For example, FIG. 29 illustrates an alternative implementation.

Figure 29:
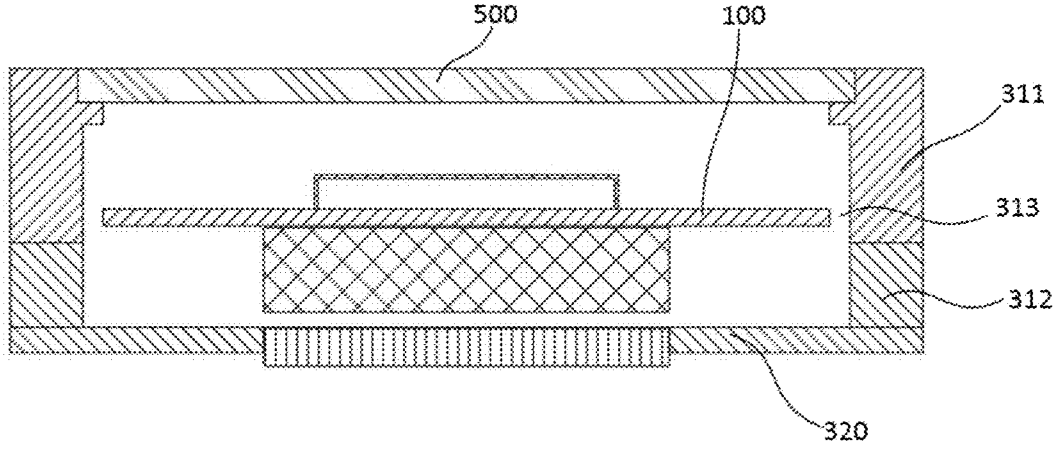
FIG. 29 is a cross-sectional view of an antenna structure according to an implementation of the present disclosure in an assembled state.

As shown in FIG. 29, in this implementation, the smart watch includes a housing. The housing includes a middle frame and a non-metallic bottom case 320. The middle frame includes a metal upper frame 311 and a non-metallic lower frame 312. In this implementation, the gap structure of the antenna is formed by a gap 313 between the mainboard 100 and the metal upper frame 311. This disclosed scheme is implemented by feeding the gap 313, and grounding via inductor and/or capacitor, that is, the upper frame 311 forms the main radiator of the antenna. Those skilled in the art can understand and fully implement the scheme in this implementation in conjunction with the foregoing, which will not be repeated.

In addition, on the basis of the implementation in FIG. 29, the upper frame 311 and the lower frame 312 can also be replaced by a complete metal middle frame, which is based on the same principle, and will not be repeated in the present disclosure.

Figure 30:
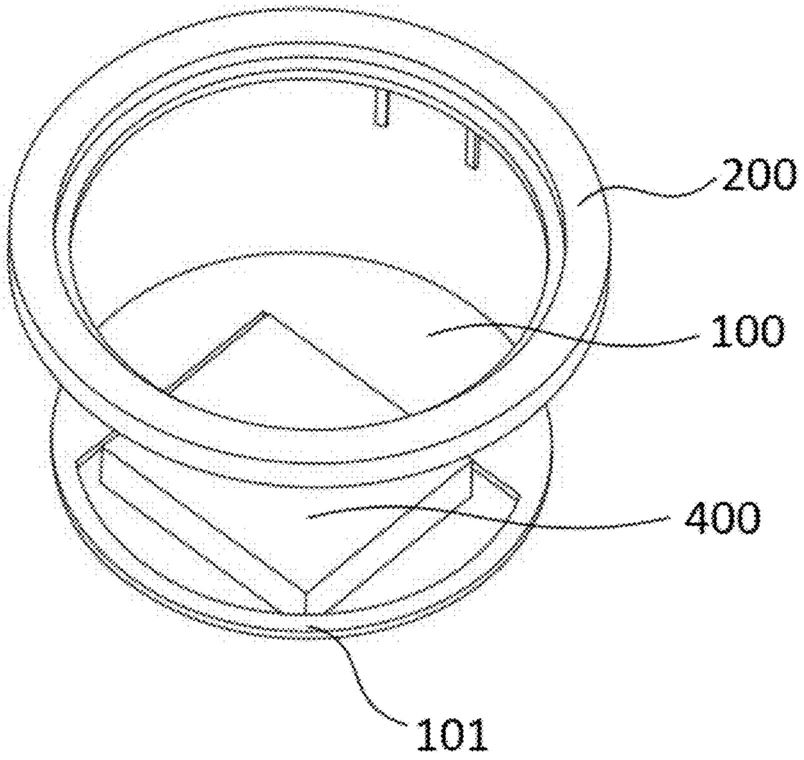
FIG. 30 is a schematic diagram of an antenna structure according to another implementation of the present disclosure.

In the implementations of the present disclosure, in order to better excite circularly polarized waves in the annular radiator, the mainboard 100 has a similar shape to the annular radiator, so as to form a gap as uniform as possible between the mainboard 100 and the annular radiator. However, in practical applications, the mainboard 100 is affected by the internal stacking design of the device, which generally makes it difficult to ensure a complete ring shape. For example, as shown in FIG. 30, the mainboard is partially removed to form an irregular shape in order to avoid the battery and other components. In this implementation, in order to ensure better excitation of circularly polarized waves in the annular radiator, an irregular edge of the mainboard 100 is supplemented using a supplementary portion 101 such that the mainboard 100 has a similar shape to the radiator 200, thereby ensuring very good antenna performance. However, it should be noted here that even if the mainboard 100 is incomplete in shape, the desired right-hand circularly polarized GPS antenna can be realized by applying inductors and/or capacitors as proposed in this application.

In an example, in the case of a smart watch for example, it is sufficient that a width of the supplementary portion 101 at the edge of the mainboard 100 is greater than 1.5 mm. In addition, the supplementary portion 101 can be integrally formed with the mainboard, or the supplementary portion 101 can be a steel sheet used to fix both ends of another component (such as a speaker) and electrically connected to the PCB, i.e., it is sufficient to ensure that the annular ground of the mainboard has a similar shape to the annular radiator. Moreover, it is sufficient that the annular ground of the mainboard has an approximate shape similar to the annular radiator, and small concave defects on the periphery of the mainboard do not affect the performance of the antenna structure according to the implementations of the present disclosure.

In some implementations, in the case of a smart watch for example, the smart watch generally includes at least a satellite positioning antenna and a Bluetooth/Wifi antenna. In this disclosed scheme, on the basis of the implementation shown in FIG. 12, the Bluetooth/Wifi antenna of the present disclosure can be designed in a variety of ways. Since the Bluetooth antenna and the Wifi antenna have the same central operating frequency that is about 2.45 GHz, for the convenience of description, the Bluetooth antenna and the Wifi antenna will be referred to as "Bluetooth antenna" hereinafter.

Scheme I: The Bluetooth antenna is implemented directly using the resonance at about 2.45 GHz generated from the higher-order resonance of the GPS antenna in the above implementation, and the higher-order resonance is mostly a linearly polarized wave that can be used for the Bluetooth antenna.

This is a case where GPS and Bluetooth share the same power feed. Although this scheme has a simple structure, it requires a combiner/splitter, which has some loss to the antenna and is of general applicability.

Scheme II: The Bluetooth antenna is designed separately inside the watch such as on the PCB, and the power feeds of the Bluetooth antenna and the GPS antenna are independent of each other. In this case, the coupling between the Bluetooth antenna and the GPS antenna is weak and negligible.

Figure 31:
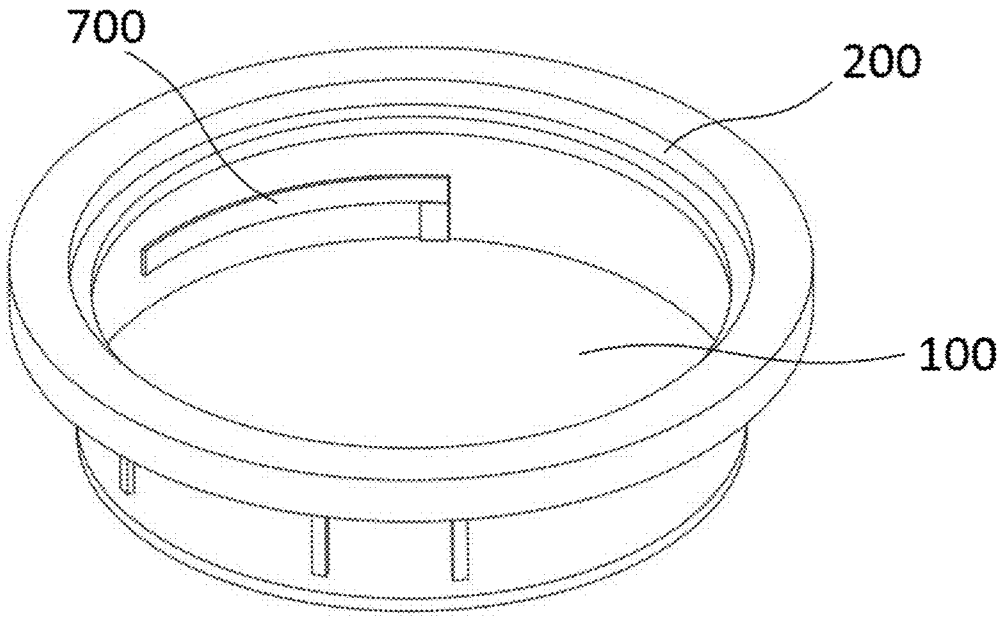
FIG. 31 is a schematic diagram of an antenna structure according to another implementation of the present disclosure.

Scheme III: As shown in FIG. 31, a Bluetooth antenna 700 is provided between the mainboard 100 and the radiator 200.

The Bluetooth antenna can be implemented by a monopole antenna or an IFA antenna. As shown, the Bluetooth antenna 700 is implemented by a monopole antenna, the radiation branch of which is parallel to the radiator 200. In this case, the Bluetooth antenna 700 and the radiator 200 have a certain coupling effect therebetween, which is equivalent to applying a fixed capacitor with a relatively small capacitance value between the mainboard 100 and the radiator 200. Therefore, the Bluetooth antenna can also have the same effect as the aforementioned capacitor, and has an influence on the circular polarization produced by the GPS antenna. Therefore, the position of the Bluetooth antenna can be set according to the foregoing, for example, the Bluetooth antenna is provided in the right-hand circular polarization interval. That is, the Bluetooth antenna can be implemented in a way that does not affect the implementation of the right-hand circularly polarized GPS antenna, according to splitting of capacitors and combining of inductors and capacitors as proposed in this application.

The wearable device according to the implementations of the present disclosure includes the circularly polarized antenna in the above implementations, and thus has all of the beneficial effects produced by the above circularly polarized antenna. Moreover, the radiator can be formed by using the metal bezel or middle frame of the wearable device such as a smart watch. On the one hand, the metal bezel or middle frame can be used as a decorative structure for the watch to improve the aesthetics of the device; on the other hand, using the metal bezel or middle frame as the radiator can reduce the occupation of the internal space of the watch by the antenna structure, and the radiator with a larger size can greatly enhance the radiation performance of the antenna. In addition, the combined grounding scheme proposed in this disclosure can be applied to the case where the original inherent resonant frequency of the antenna radiator is less than or greater than the GPS operating frequency of 1.575 GHz.

The structure and implementation of the circularly polarized antenna in the present disclosure have been described above by using the smart watch as an example. It can be understood that the circularly polarized antenna in the present disclosure, when applied in different wearable devices, can be modified accordingly based on the structures of the devices.

Figure 32:
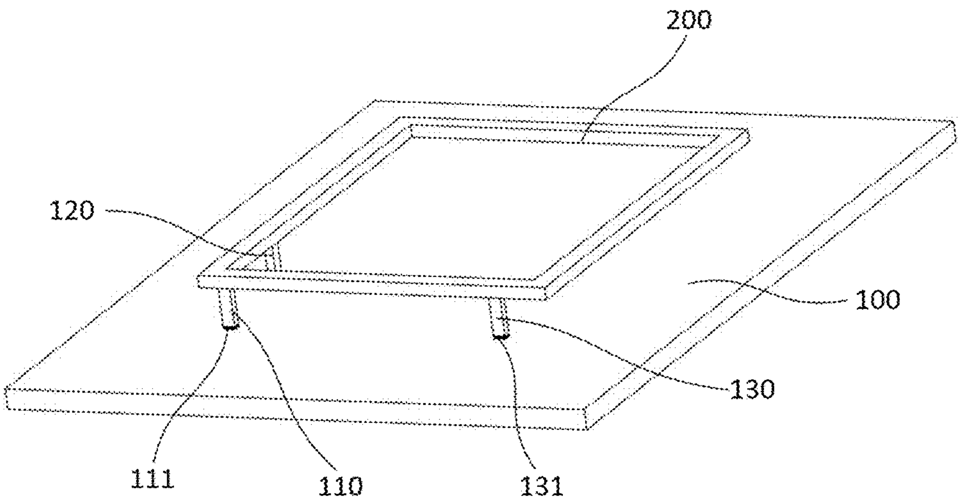
FIG. 32 is a schematic diagram of an antenna structure according to another implementation of the present disclosure.

For example, a circularly polarized antenna is shown in FIG. 32. In the aforementioned implementations of the smart watch, since the mainboard 100 is located inside the watch, the size of the mainboard 100 is smaller than that of the radiator 200. While in this implementation, the size of the mainboard 100 is larger than that of the radiator 200, and the radiator 200 has a non-circular ring structure, such as a rectangular ring structure as shown. It can be understood that other structures and implementations of the antenna in this implementation can be referred to the foregoing, and will not be repeated herein.

The antenna structure in the implementation of FIG. 32 is applicable to wearable devices such as smart glasses or smart earphones. Those skilled in the art can understand that this implementation is only an example, and there can be any other suitable implementations based on the inventive concept of realizing circularly polarized antennas in the present disclosure, which will not be enumerated in the present disclosure.

The circularly polarized antenna structure according to the implementations of the present disclosure directly feeds the annular radiator, pulls the current in the radiator with inductors and/or capacitors, such that an effective circulating current being rotated is produced in the annular radiator, thereby forming a circularly polarized wave and realizing a circularly polarized antenna. Compared with a linearly polarized antenna, the circularly polarized antenna has higher reception efficiency, resulting in more accurate positioning during satellite positioning. Compared with circularly polarized antennas according to the implementation schemes in the related art, the circularly polarized antenna in the present disclosure does not need to couple other structures, which greatly simplifies the structure and difficulty of the circularly polarized antenna, and makes it easier to be implemented in a wearable device with a smaller volume. Moreover, through the above description of the position and number of the capacitor and inductor, as well as the discussion of the influence of the inductor and capacitor on the effective electrical length of the antenna, more design forms of antenna structures can be provided to meet the applicability of the antenna structures in various devices with different sizes.

It is apparent that the above implementations are merely examples for clarity of illustration, and are not limitations on the implementations. For those ordinary skilled in the art, other variations or modifications in different forms may be made based on the above description. It is not necessary or possible to exhaust all implementations herein. However, obvious variations or modifications derived therefrom still fall within the protection scope of the present disclosure.

What is claimed is:

1. A circularly polarized antenna, applicable to a wearable device comprising a mainboard, the mainboard comprising a feeding module and a grounding module, and the circularly polarized antenna comprising:

an annular gap structure comprising an annular antenna radiator, the radiator having an effective perimeter equal to a wavelength corresponding to a central operating frequency of the circularly polarized antenna;

a single feeding terminal-connected across the gap structure, having a first end electrically connected to and in direct contact with the radiator and a second end electrically connected to and in direct contact with the feeding module of the mainboard; and at least one first grounding terminal connected across the gap structure, having a first end electrically connected to and in direct contact with the radiator and a second end electrically connected to the grounding module of the mainboard solely through an inductor, wherein a rotating current is to be generated for circular polarization by directly connecting the single feeding terminal and the feeding module of the mainboard, and connecting the at least one grounding terminal to the grounding module of the mainboard solely through the inductor.

2. The circularly polarized antenna according to claim 1, wherein a line connected between the single feeding terminal and a center point of the radiator is a first connecting line, and a line connected between the at least one first grounding terminal and the center point of the radiator is a second connecting line, and a first included angle α is formed from the first connecting line to the second connecting line along a first direction;

the first direction is a clockwise direction around the radiator; and $$\alpha \in \left(0, \frac{\pi}{2}\right) \cup \left(\pi, \frac{3\pi}{2}\right).$$

3. The circularly polarized antenna according to claim 1, further comprising:

at least one second grounding terminal electrically connected to the radiator a first end, and electrically connected to the grounding module of the mainboard via a capacitor at a second end.

4. The circularly polarized antenna according to claim 3, wherein the capacitor comprises a transient voltage suppressor (TVS).

5. The circularly polarized antenna according to claim 1, wherein the gap structure comprises a gap formed between the radiator and the mainboard.

6. The circularly polarized antenna according to claim 1, wherein the radiator comprises a metal bezel of the wearable device.

7. The circularly polarized antenna according to claim 6, wherein the gap structure comprises a gap formed between the metal bezel and a metal middle frame of the wearable device.

8. The circularly polarized antenna according to claim 1, wherein the radiator comprises a metal middle frame of the wearable device.

9. The circularly polarized antenna according to claim 1, wherein:

an inherent resonant frequency corresponding to a physical perimeter of the radiator is less than the central operating frequency of the circularly polarized antenna.

10. A wearable device, comprising the circularly polarized antenna according to claim 1 and a housing in which the mainboard is disposed, wherein the radiator comprises at least a part of the housing.

11. The wearable device according to claim 10, wherein the housing comprises a middle frame, a bottom case, and an annular metal bezel fixedly disposed on an end surface of the middle frame away from the bottom case, wherein the radiator comprises the annular metal bezel.

12. The wearable device according to claim 11, further comprising:

a second antenna disposed on the mainboard, the second antenna having a radiation branch coupled to the annular metal bezel.

13. The wearable device according to claim 11, wherein the middle frame is made of a metallic material, and an insulating layer is provided between the middle frame and the annular metal bezel.

14. The wearable device according to claim 10, wherein the housing comprises a metal middle frame and a non-metallic bottom case, wherein the radiator comprises the metal middle frame.

15. The wearable device according to claim 10, wherein the inductor is configured to adjust a resonant frequency of the circularly polarized antenna to the central operating frequency of the circularly polarized antenna.

16. The wearable device according to claim 10, wherein the circularly polarized antenna further comprises:

at least one second grounding terminal electrically and mechanically connected to the radiator at a first end, and to the grounding module of the mainboard via a capacitor at a second end.

17. A wearable device, comprising:

a circuit board, comprising a feeding module and a grounding module; and a circularly polarized antenna comprising:

an annular gap structure comprising an annular antenna radiator, the radiator having an effective perimeter equal to a wavelength corresponding to a central operating frequency of the circularly polarized antenna;

a single feeding terminal connected across the gap structure, having a first end electrically connected to and in direct contact with the radiator and a second end electrically connected to and in direct contact with the feeding module of the circuit board; and at least one first grounding terminal connected across the gap structure, having a first end electrically connected to and in direct contact with the radiator and a second end electrically connected to and in direct contact with a first end of an inductor, wherein a second end of the inductor is directly connected to the grounding module of the circuit board, wherein a current phase difference is formed between the first end of the single feeding terminal and the first end of the at least one first grounding terminal, so as to generate a rotating current in the radiator for circular polarization.

18. The wearable device according to claim 17, further comprising:

a housing, wherein the radiator comprises at least a part of the housing.

19. The wearable device according to claim 17, wherein the gap structure comprises a gap formed between the radiator and the circuit board.

20. The wearable device according to claim 17, wherein the radiator comprises a bezel of the wearable device, and the gap structure comprises a gap formed between the bezel and a middle frame of the wearable device.

* * * * *